United States Patent
Georgitzikis et al.

(10) Patent No.: US 11,220,907 B2
(45) Date of Patent: Jan. 11, 2022

(54) MECHANISM FOR TRANSFORMING RECIPROCAL TO ROTATIONAL MOTION OR VICE VERSA, AND MECHANISM APPLICATIONS

(71) Applicants: Elpida Georgitziki, Heraklion Attica (GR); Vasilios Georgitzikis, Heraklion Attica (GR); Anna Georgitziki, Heraklion Attica (GR)

(72) Inventors: Georgios Georgitzikis, Heraklion Attica (GR); Vasilios Georgitzikis, Heraklion Attica (GR)

(73) Assignees: Elpida Georgitziki, Heraklion (GR); Vasilios Georgitzikis, Heraklion (GR); Anna Georgitziki, Heraklion (GR)

( * ) Notice: Subject to any disclaimer, the term of this patent is extended or adjusted under 35 U.S.C. 154(b) by 0 days.

(21) Appl. No.: 16/314,151

(22) PCT Filed: Apr. 23, 2018

(86) PCT No.: PCT/EP2018/060281
§ 371 (c)(1),
(2) Date: Dec. 28, 2018

(87) PCT Pub. No.: WO2019/134763
PCT Pub. Date: Jul. 11, 2019

(65) Prior Publication Data
US 2021/0199010 A1     Jul. 1, 2021

(30) Foreign Application Priority Data
Jan. 3, 2018   (GR) .............................. 20180100001

(51) Int. Cl.
*F01B 9/06*     (2006.01)
*F16H 25/12*   (2006.01)

(52) U.S. Cl.
CPC ............. *F01B 9/06* (2013.01); *F16H 25/125* (2013.01)

(58) Field of Classification Search
CPC .... F01B 9/06; F16H 25/125; F16H 2009/065; F16H 2009/061; F16H 25/12; F16H 25/08; F16H 23/00; F16H 23/10
See application file for complete search history.

(56) References Cited

U.S. PATENT DOCUMENTS

| | | | |
|---|---|---|---|
| 2,401,466 | A | 6/1946 | Davis et al. |
| 4,854,837 | A | 8/1989 | Cordray |
| 5,036,809 | A | 8/1991 | Goodman |

(Continued)

FOREIGN PATENT DOCUMENTS

| | | |
|---|---|---|
| DE | 2902025 B1 | 7/1980 |
| EP | 0320171 A1 | 6/1989 |

(Continued)

OTHER PUBLICATIONS

International Search Report issued in corresponding International Patent Application No. PCT/EP2018/060281 dated Sep. 10, 2018.

(Continued)

*Primary Examiner* — Jacob M Amick
(74) *Attorney, Agent, or Firm* — Finch & Maloney, PLLC; Michael J. Bujold; Jay S. Franklin

(57) ABSTRACT

A mechanism for transforming rotating into reciprocating motion, or vice versa, comprising first and second annular components (1, 3) located coaxially along a longitudinal axis (ΔA). The first and second annular components are both able to rotate around and reciprocate along the longitudinal axis. A side (A) of the first annular component (1) is in continuous contact, in at least one point, with a neighboring side (Γα) of the second annular component (3) so that the second annular component (3) is able to rotate relative to and in continuous contact with at least one point with the (Continued)

adjacent side (A). The contacting sides are undulated surfaces (A, Γα) such that if the first and second annular components are forced into rotational motion, they remain in continuous contact so that every point of the undulated surfaces will trace, relative to the other, an undulated trajectory and also execute reciprocating motion.

16 Claims, 20 Drawing Sheets

(56) References Cited

U.S. PATENT DOCUMENTS

| | | |
|---|---|---|
| 7,299,740 B2 | 11/2007 | Adams |
| 7,438,027 B1 | 10/2008 | Hinderks |
| 10,115,545 B2 | 10/2018 | Andaluz Sorli |
| 2005/0155443 A1 | 7/2005 | Krozek |
| 2015/0020680 A1* | 1/2015 | Liao ........................ F01C 9/007 92/172 |

FOREIGN PATENT DOCUMENTS

| | | |
|---|---|---|
| EP | 0432786 A1 | 6/1991 |
| EP | 1635059 A2 | 3/2006 |
| EP | 2826954 A1 | 1/2015 |
| EP | 3018672 A1 | 5/2016 |
| FR | 370319 A | 2/1907 |
| GB | 27071 A | 2/1914 |
| GB | 304701 A | 4/1930 |
| JP | 558206801 A | 12/1983 |
| RU | 2047024 01 | 10/1995 |

OTHER PUBLICATIONS

Written Opinion issued in corresponding International Patent Application No. PCT/EP2018/060281 dated Sep. 10, 2018.
Greek Search Report issued in corresponding Greek Patent Application No. 20180100001 dated Jan. 14, 2019.

* cited by examiner

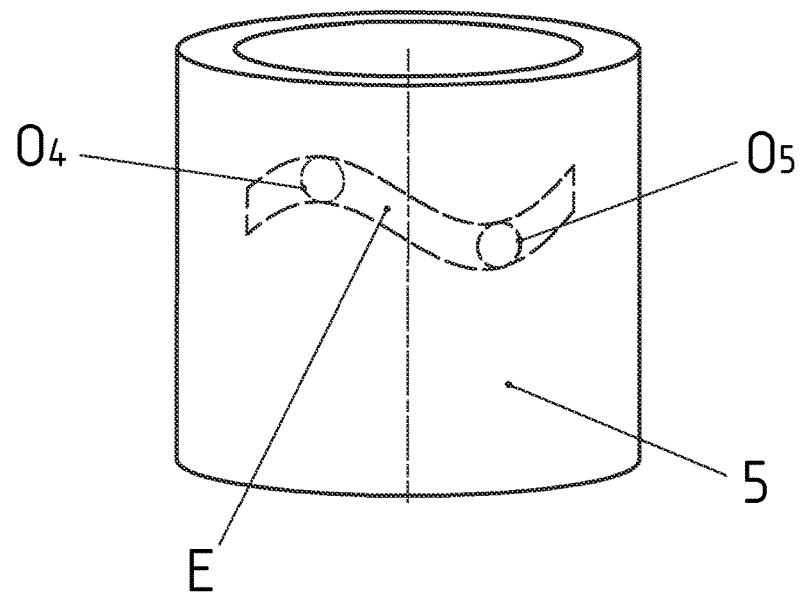
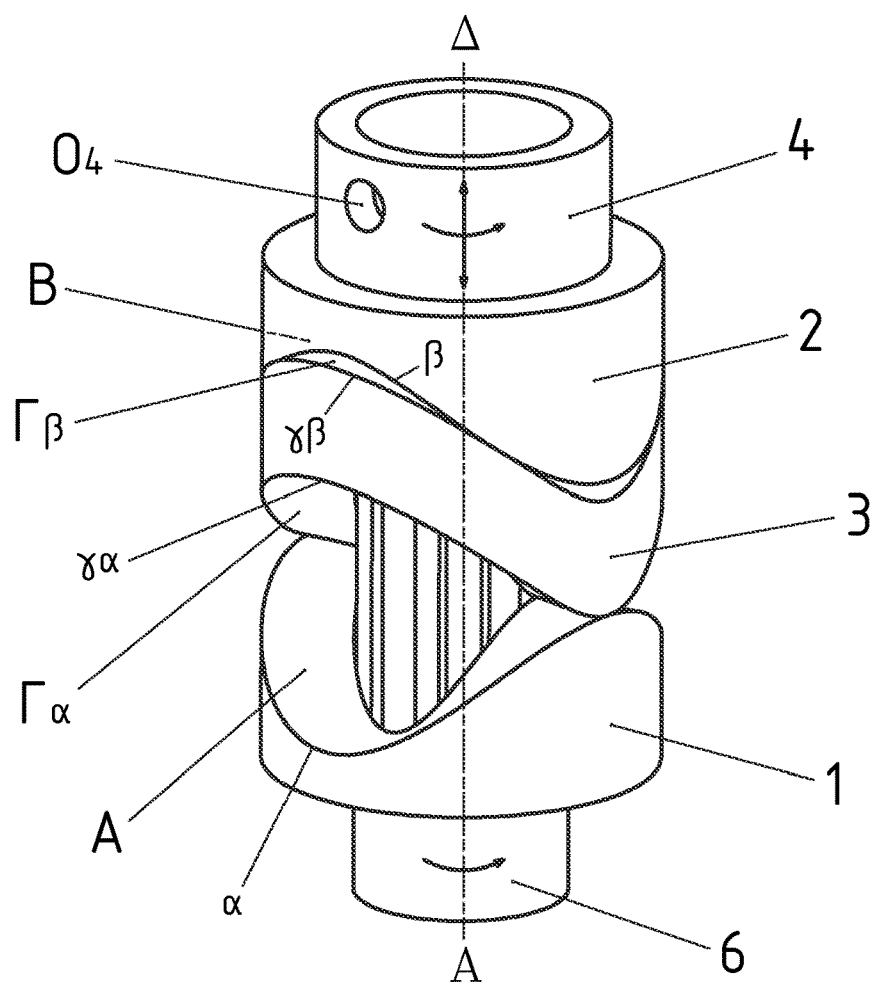
Fig. 2

Figure 15.a
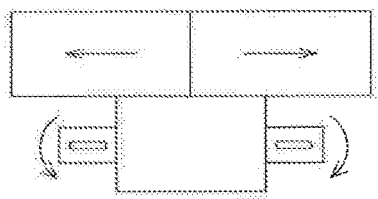
Figure 15.b
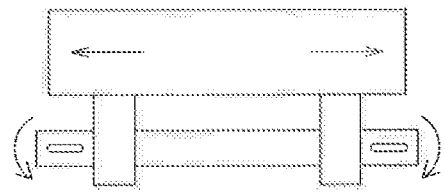
Figure 15.c
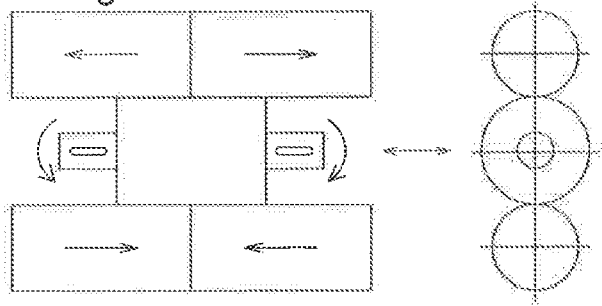
Figure 15.d
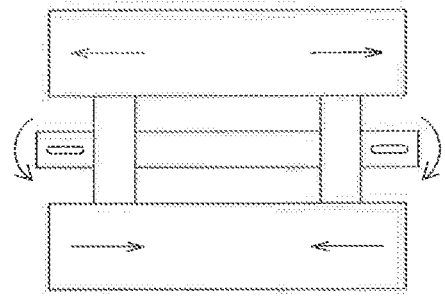
Figure 15.e
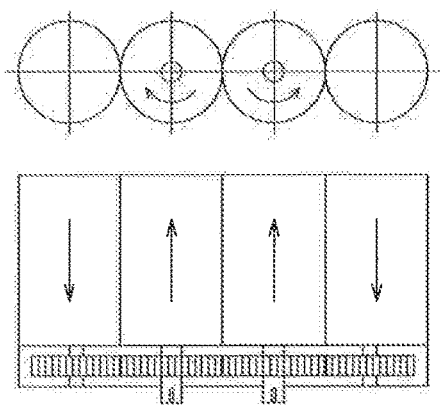
Figure 15.f
Figure 15.g
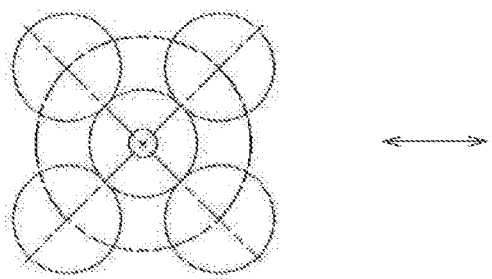
Figure 15.h
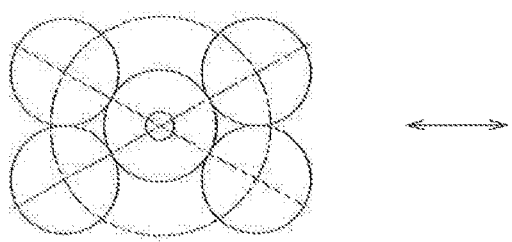

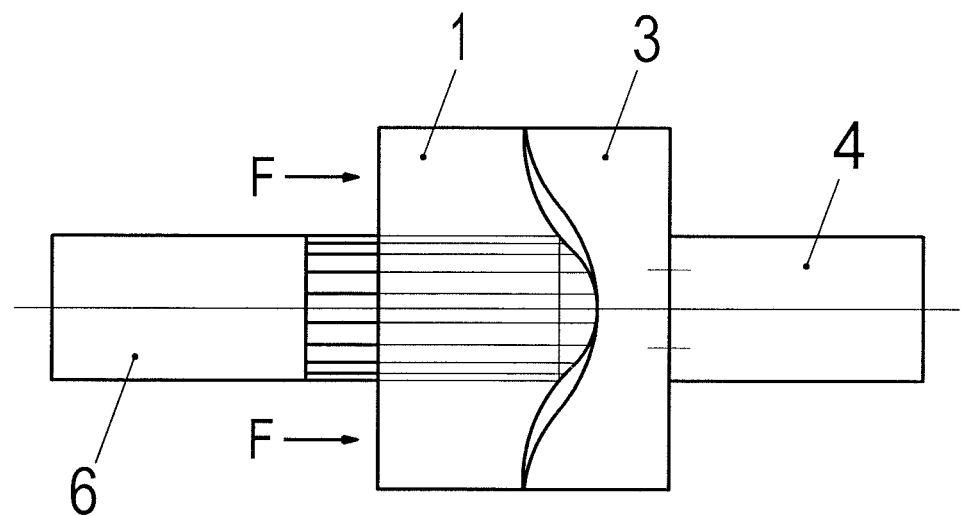
Figure 16.a
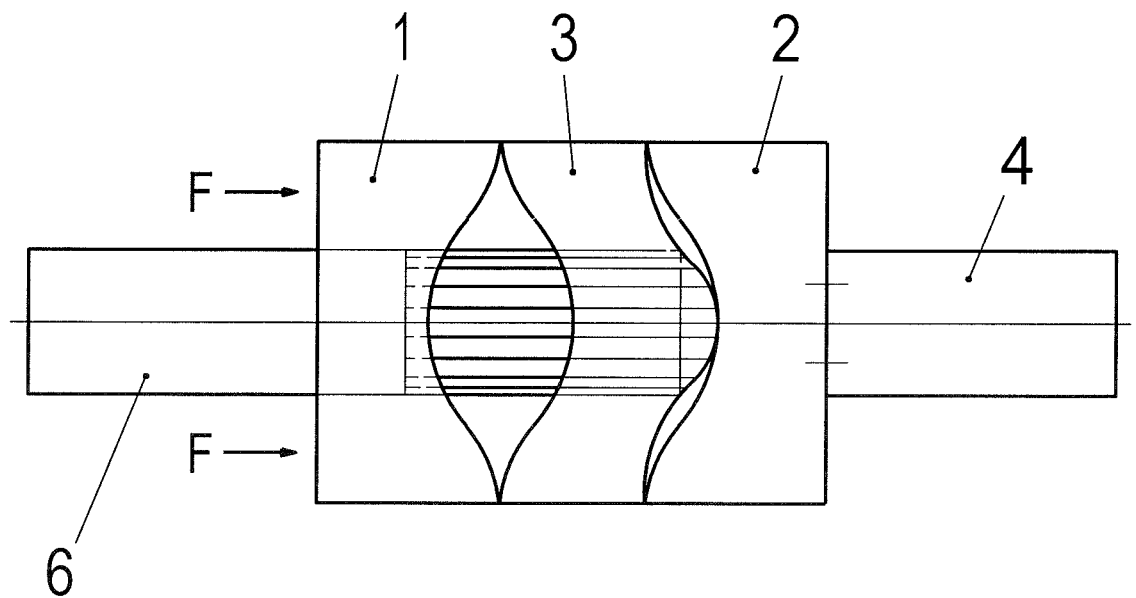
Figure 16.b

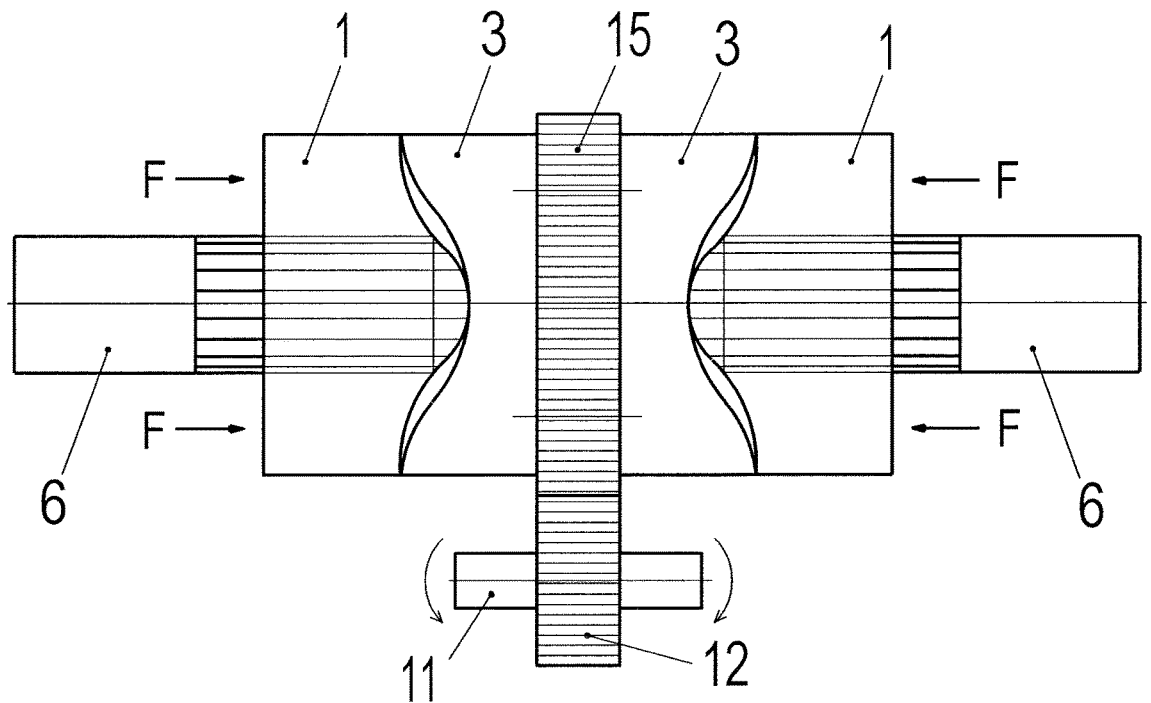
Figure 17.a
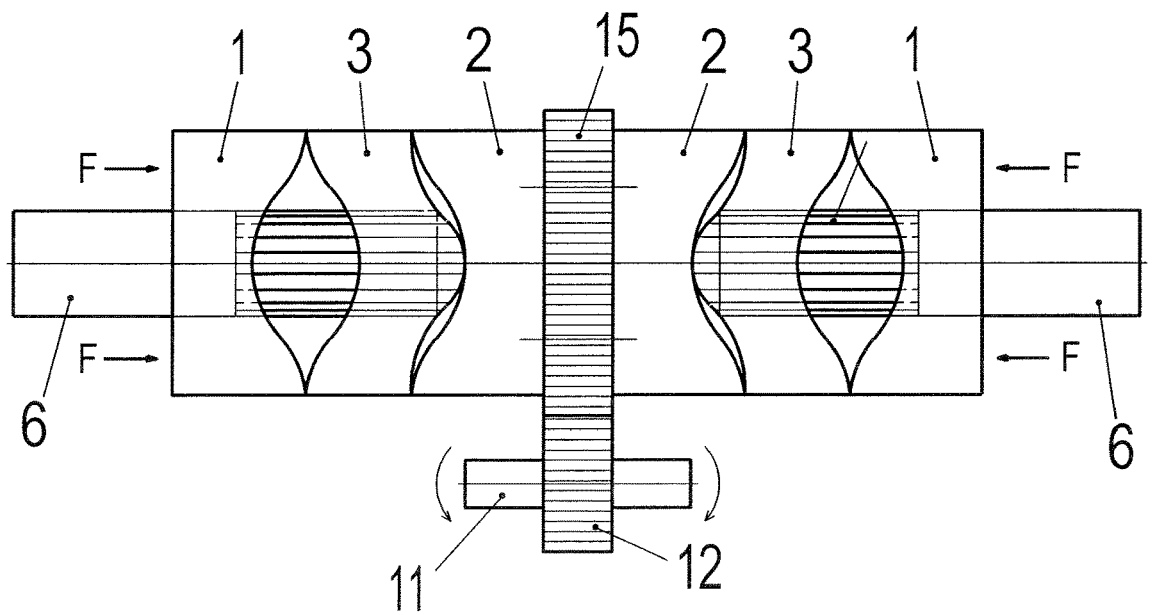
Figure 17.b

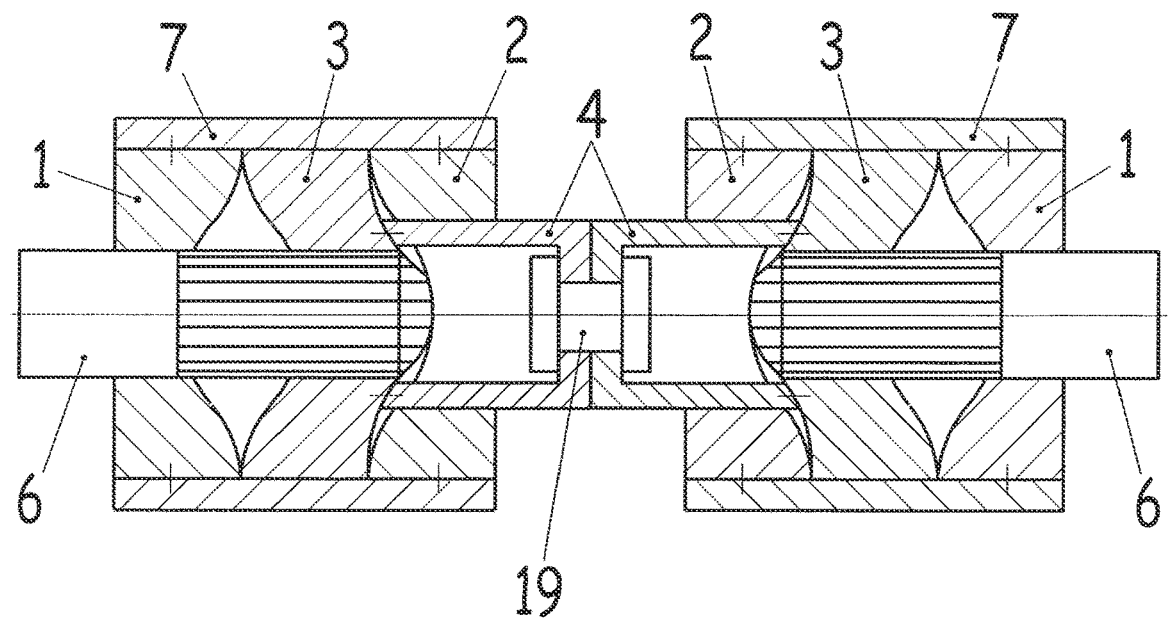
Figure 18.a
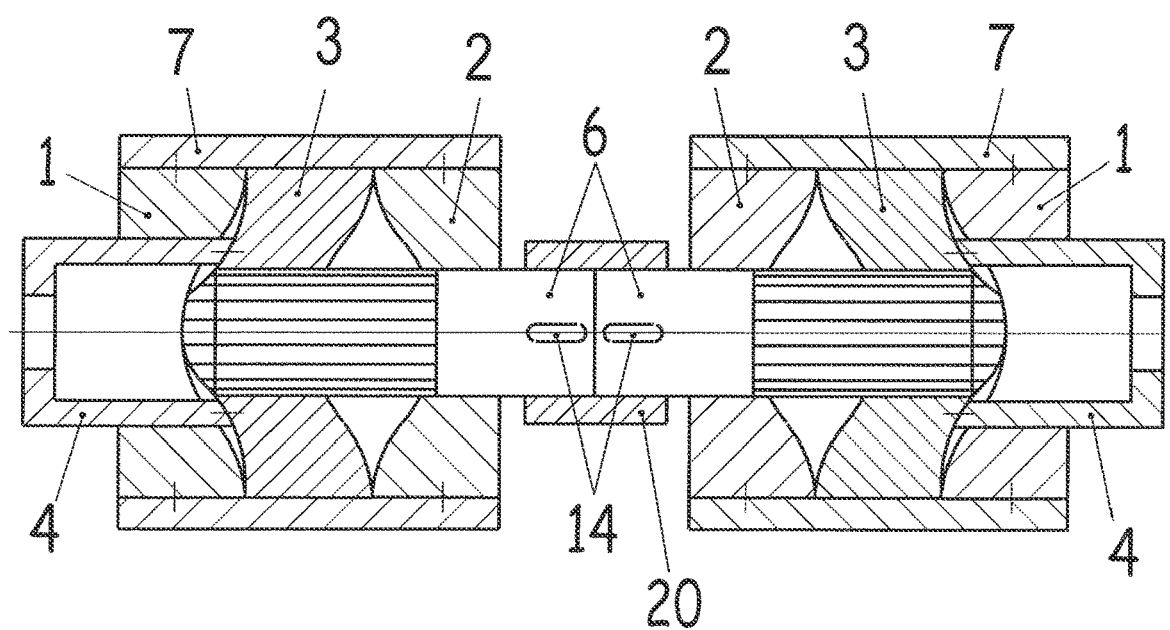
Figure 18.b

MECHANISM FOR TRANSFORMING RECIPROCAL TO ROTATIONAL MOTION OR VICE VERSA, AND MECHANISM APPLICATIONS

The invention relates to a mechanism for transforming reciprocal to rotational motion or vice versa according to claim 1. It relates also to applications for the mechanism, as in fluid flow control valves, in piston engines, such as motors or pumps/compressors, in automation systems as well as in clutches, differentials, rotation/reciprocation speed increasing-reducing device and electromechanical couples in power generators/electric motors.

The most known and widespread straight-line reciprocal to rotational motion transformation mechanism is the piston—piston rod—crank mechanism. It finds widespread application in piston engines (motors or pumps/compressors) operating usually with air, water (liquid or steam), oil and fuels in a liquid or gaseous state (e.g. hydrocarbons, hydrogen etc). The flow control of each working fluid is achieved by valves of various types, opening and closing using many different ways or mechanisms (e.g. gravity, springs, rods, camshafts etc.).

A serious disadvantage of the piston—piston rod—crank mechanism, as well as the engines based thereon, is the complexity and the large number of moving parts. The same applies also to the kinematic properties relating to the position, speed and acceleration of the moving parts as well as the vibrations caused by the inertial forces being developed. This is why balancing the mechanism is imperative; however balancing does not completely solve the problem due to the higher order harmonics remaining. Moreover, in the ICEs (Internal Combustion Engines), a disadvantage of the mechanism comprises also the piston inability to rest at the Top Dead Centre (TDC) and the Bottom Dead Centre (BDC) for a certain time interval, in order for the combustion to improve and the efficiency to increase, as well as to allow adequate time for cylinder exhaust gases sweeping/flushing out to take place in the two-stroke engines, respectively.

The present invention concerns a simple mechanism for transforming rectilinear reciprocating motion to rotational, or vice versa, without a crankshaft and piston rod, being also able to provide the possibility of delaying the inversion of motion at the extreme positions of reciprocation (TDC and BDC). At the same time, it allows the provision of a valve configuration with simple apertures for fluid flow control. It also concerns products that can incorporate said mechanism and/or valve configuration with simple apertures, such as e.g. piston engines (motors or pumps/compressors), clutches, differentials, rotation/reciprocation speed increasing-reducing device, electromechanical couples in power generators/electric motors and automations.

According to the invention a mechanism for transforming reciprocal to rotational motion is proposed, or vice versa, including a first annular component and a second annular component coaxially mounted the first one adjacent the second along a longitudinal axis, wherein both of them are capable of rotating round the longitudinal axis and reciprocating along the longitudinal axis, wherein the side of the first annular component adjacent the second annular component is in continuous contact, in at least one point, with the neighbouring side of the second annular component, wherein the contacting sides are smooth undulated surfaces formed as a geometric locus of the radii passing through smooth undulated curves of the external cylindrical surface of the first and second annular components, starting from their external surface and terminating in their internal surface, being characterized by n (natural number≠0) repeated pairs of crests and valleys, wherein said crests/valleys are symmetric relative to the level defined by the highest/lowest point of the crest/valley (respectively) and the longitudinal axis.

According to the invention the crests of the undulated surface of the first annular component may be in contact with the crests of the undulated surface of the second annular component and in this position the points of contact are located on a plane perpendicular to the longitudinal axis, relative to which the undulated surfaces of the first annular component and the second annular component are symmetrical.

In addition the crests of each and every undulated surface are smaller than the geometrically similar valleys with a similarity ratio of 1:3, such that, when the crests enter the valleys of the other, and crest edges come into contact with the lowest point of the valleys of the opposite undulated surface, there is free space left between the undulated surfaces, resulting, when lubricated, in achieving friction and wear minimization owing to dynamic lubrication.

With the proposed mechanism if the first annular component and the second annular component are forced into rotational motion relative to each other, remaining at the same time in continuous contact, then each point of the contacting undulated surfaces will trace, in relation to the other, an undulated trajectory and will execute at the same time, in relation to the other, a reciprocating motion n-times the frequency, wherein n is the number of crests/valleys, of the corresponding rotational motion frequency, between a TDC (Top Dead Centre) and a BDC (Bottom Dead Centre), this relative motion being executed by each component connected firmly to one of the annular components, while each component, e.g. a piston, connected to one of the annular components, in such a way that this connected component is free not to follow the rotation of the component to which it is connected, executes reciprocating motion only relative to the other annular component so that rotational motion is transformed to reciprocating motion of the component with or without coexisting rotation, whereas, conversely, the forced reciprocating motion of one annular component relative to the other is transformed to rotational motion of the component with or without the coexistence of reciprocating motion.

The edges of the crests and valleys of the undulated surfaces of the two annular components may be points or straight sections perpendicular to the longitudinal axis, wherein if the edges of the crests and valleys are points, in case of relative rotational motion between the two annular components at constant speed, a generally simple and in special cases harmonic reciprocation results, whereas if the edges of the crests and valleys are straight sections, in the case of relative rotational motion between the two annular components at constant speed, a reciprocation results with a delay in the reversal of motion in the TDC and BDC proportional to the length of the straight sections. The reciprocating motion will be harmonic in case the planar spread of these curves comprises sinusoidal curves without straight sections in the crests perpendicular to the longitudinal axis.

Note 1: In the previous paragraph, but also in the subsequent description as well as in the claims, whenever—for simplicity and brevity reasons in expression—reference is made to "points or straight sections" of the crest and valley edges and to "curves" of the frontal undulated surfaces of the annular components, in reality, this reference implies the planar spread of the undulated curves of the external surfaces of the first, second and, whenever provided, third annular component from which initiate the radii forming the adjacent (neighbouring) undulated surfaces of the annular components.

Note 2: In the description as well as in the claims, whenever reference is made to contact "in at least one point" between the first and second or second and third annular components 1 and 2 or 2 and 3, respectively, this point is meant to denote position. Actually contact is taking place in the straight sections of the radii forming the undulated surfaces of the annular components 1, 2 and 3, which under load, convert to narrow strips: practically to narrow trapezia.

The second annular component may function as a rotor and the first as a stator or vice versa. In the present description, applications are presented wherein the second annular component functions as a rotor and the first as stator.

An additional mechanism is provided, in many applications, forcing the second annular component to be pushed on to the first annular component, such that the contacting undulated surfaces are in continuous contact relative to each other.

FIGS. 1-20 show the operating principle of the mechanism and its applications. These drawings do not follow precisely the principles of mechanical engineering drawing. These illustrations have not been drawn in great detail, and comprise simplifications, the major ones being the following:

a. FIGS. 5 to 13 do not show views, only half-elevations: the arrangement with the rotor and piston position in TDC appears on the right and on the left the same in BDC.
b. Certain components known to the skilled artisan in the field are shown as a single integral part, however, in reality they are complexes of more than one component.
c. Usual engine parts, known to the skilled artisan in the field (e.g. screws, ball-bearings, bushings, gaskets, flanges etc.) are not shown.
d. Small axial lines indicate that the neighbouring components are firmly connected together.

FIGS. 1, 2, 3 and 4 show in a simplified way the operating principle upon which the present invention is based, whereas in FIG. 2 (above) a simple array of valves is shown in a simplified way, controlling the fluid flow, according to the present invention.

FIGS. 15.*a* to 15.*h* show multi-cylinder arrangements based on FIGS. 5 to 14, wherein absolute neutralisation is achieved of the inertial forces resulting from the reciprocating masses of the rotor and the piston.

FIGS. 16.*a* and 16.*b* show arrangements of clutches based on the motion transformation mechanism according to the invention.

FIGS. 17.*a* and 17.*b* show arrangements of differentials based on the motion transformation mechanism according to the invention.

FIGS. 18.*a* and 18.*b* show arrangements of rotation/reciprocation speed increasing-reducing device based on the motion transformation mechanism according to the invention.

Figure 19:
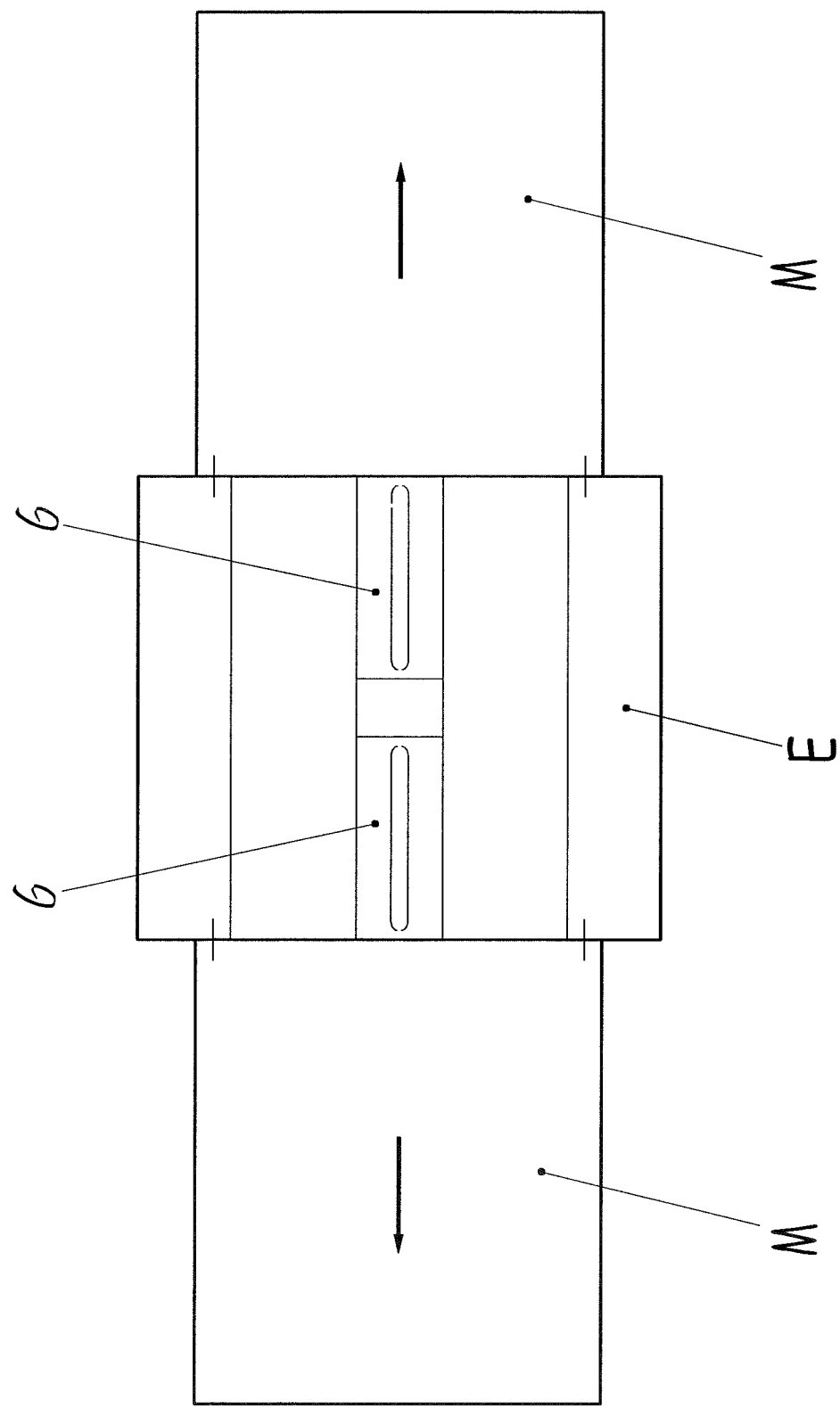

FIG. 19 shows the coupling of an electrical engine (power generator/electric motor) with two engines (motors or pumps/compressors, respectively) based on the motion transformation mechanism according to the invention.

Figure 20:
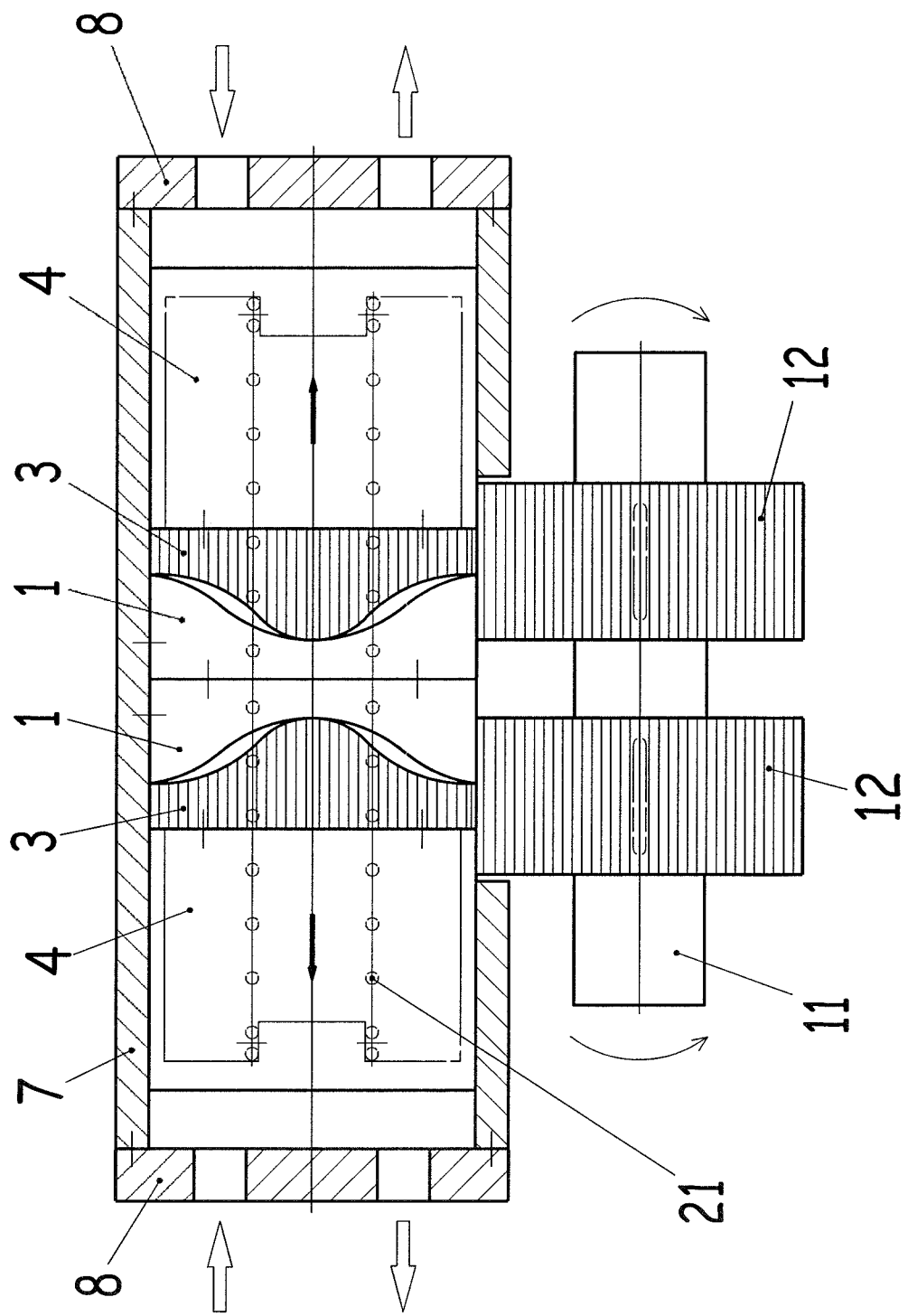

FIG. 20 presents engines based on the motion transformation mechanism according to the invention, with two mirror-image symmetric cylinders, a pair of undulated surfaces per cylinder plus a mechanism forcing them into contact using pressure and the assistance of a spring.

Figure 1:
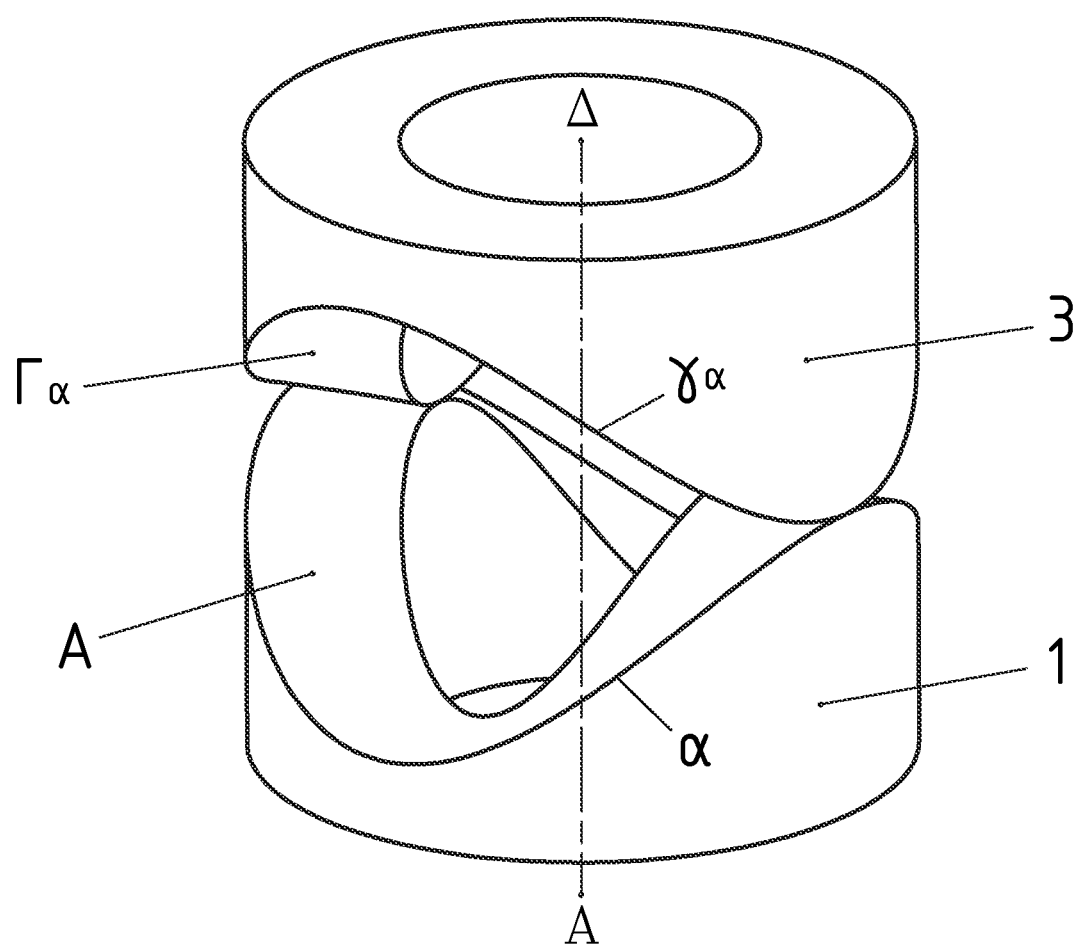

In FIG. 1 the motion transformation mechanism is shown, according to the invention, comprising a first annular component 1 and a second annular component 3 coaxially located, the first beside the second, along a longitudinal axis $\Delta A$, the two components being able to rotate around the longitudinal axis $\Delta A$ and to reciprocate along the longitudinal axis $\Delta A$. Side A of the first annular component 1 adjacent the second annular component 3 is in continuous contact in at least one point with neighbouring side $\Gamma_\alpha$ of the second annular component 3, such that the second annular component 3 can move relative to the first annular component 1 being in continuous contact in at least one point with neighbouring side A of the first annular element 1. The contacting sides are smooth undulated surfaces A, $\Gamma_\alpha$, shaped as a geometric locus of the radii passing through the undulated curves $\alpha$ and $\gamma_\alpha$, respectively, of the external cylindrical surface of the first and second annular component 1, 3, starting off from their external surface and terminating in their internal surface and being characterized by n (natural number≠0) repeated pairs of geometrically similar crests and valleys with a similarity ratio 1:3, wherein the crests/valleys are symmetric as regards the level defined by the upper/lower point of the crest/valley (respectively) and the longitudinal axis $\Delta A$. In FIGS. 1 to 4, n=2.

If the first annular component 1 and the second annular component 3 are forced into rotational motion relative to each other, remaining at the same time in continuous contact, then each point of the undulated surfaces A, $\Gamma_\alpha$ will trace, in relation to the other, an undulated trajectory and will execute at the same time a reciprocating motion with a frequency n-times, wherein n is the number of crests/valleys, the corresponding rotational motion frequency, between a TDC (Top Dead Centre) and a BDC (Bottom Dead Centre), this relative motion being executed by each component connected firmly to one of the annular components 1 or 3, on the other hand each component connected to one of the annular components 1 or 3, such that this connected component is free not to follow the rotation of the component to which it is connected, executes reciprocating motion only, relative to the other annular component, so that rotational motion is transformed to reciprocating motion of the component with or without coexisting rotation, whereas, conversely the forced relative reciprocating motion of one annular component 1 or 3 relative to the other is transformed to rotational motion of the component with or without the coexistence of reciprocating motion.

According to FIG. 1, the crests of each and every undulated surface A, $\Gamma_\alpha$ are smaller than the geometrically similar valleys with a similarity ratio of 1:3, such that, when they enter the valleys of the other, and points of the crests come into contact with points of the opposite undulated surface, there is free space left between the undulated surfaces, resulting, when lubricated, in achieving friction and wear minimization owing to dynamic lubrication.

In FIG. 2 a motion transformation mechanism is shown, according to the invention, differing from the mechanism of FIG. 1 in that it comprises an additional mechanism forcing the second annular component 3 to be pushed onto the first annular component 1, in order for the undulated surface $\gamma_\alpha$ to be in continuous contact with undulated surface A. The additional mechanism comprises a third annular component 2, coaxially mounted in relation to the first and the second annular components 1, 3 such that the second annular component 3 is located between the first and the third annular component 1, 2, the adjacent side thereof, being the one towards the second annular component 3, is undulated surface B characterized by the same undulated curve A of the first annular component 1, and by being its mirror-image in space and in continuous contact in at least one point with its adjacent side of the second annular component 3, which is also undulated surface $\Gamma_\beta$ characterized by having the same undulated curve-shape with the first annular component 1 of the adjacent side $\Gamma_\alpha$ of the second annular component 3, but located symmetric to surface $\Gamma_\alpha$ and displaced distally with the crests located opposite the valleys of surface $\Gamma_\alpha$, such that the second annular component 3 may rotate relative to the first and third annular components 1, 2 and in continuous contact in at least one point with one side of the first and with one side of the third annular component 1,2.

In the example of FIG. 2 the second annular component 3 is connected to a piston 4 either firmly, or in such a way that the second annular component 3 and the piston 4 are free to rotate independently around the longitudinal axis ΔA. Furthermore, a cylindrical liner 5 is shown (dismantled in the extension of longitudinal axis ΔA), inside which moves—in circumferential contact—cylindrical piston 4 covered by a cover 8. In this example the second annular component 3 functions as a rotor, whereas first and third annular components 1, 2 function as stators.

If piston 4 is concave and connected firmly to the second annular component 3, and at least one aperture $O_4$ is located on piston surface 4, in case of rotational motion of the second annular component 3, aperture $O_4$, tracing a wavy trajectory E, will meet at least one aperture $O_5$ of fixed liner 5 found inside, or crosses trajectory E. The common points of apertures $O_4$ and $O_5$ allow for periodic communication between the interior of piston 4 and the exterior of liner 5, for the time duration the apertures of piston 4 and liner 5 are communicating. Thus, a very simple arrangement of fluid flow control valves is created, between the internal space and the external environment, in a cylinder of a piston engine, through concave piston 4 and liner 5.

Figure 3:
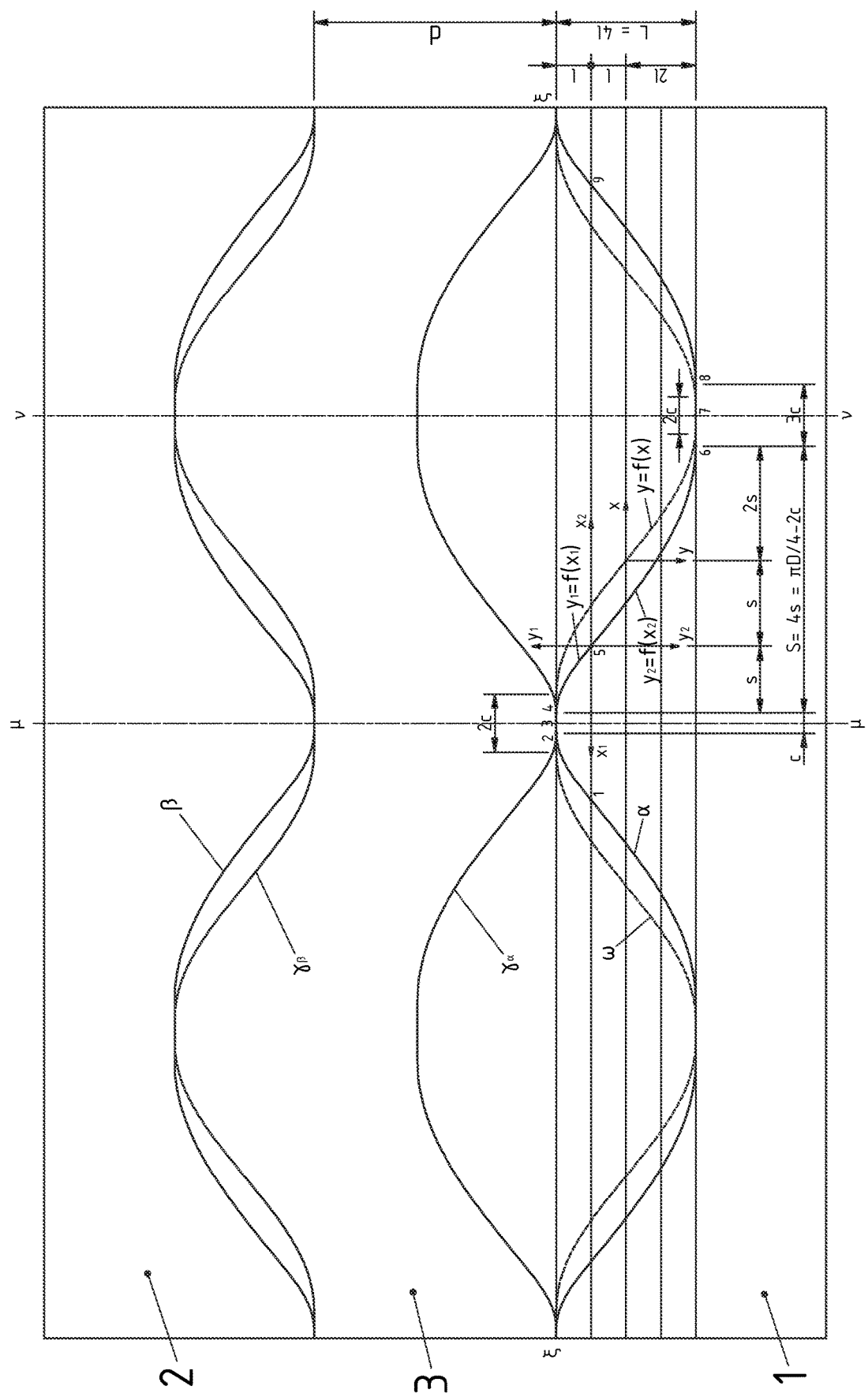

In FIG. 3 spreads are shown of the undulated curves α, $\gamma_\alpha/\gamma_\beta$ and β, respectively, of the external cylindrical surfaces of the first, second and third annular components 1, 3 and 2 of FIG. 2.

From FIG. 3 emerges that the crests of the undulated surface of the first annular component 1 may be in contact with the crests of the undulated surface of the second annular component 3 and that in this location the undulated surfaces A, $\Gamma_\alpha$ of the first annular component 1 and the second annular component 3 are both in symmetry to a plane connecting together their points of contact, whereas in this location the crests of the undulated surface B of the third annular component 2 are in contact with the valleys of the opposite undulated surface $\Gamma_\beta$ of the second annular component 3 and the crests of the undulated surface of the second annular component 3 are in contact with the valleys of the opposite undulated surface of the third annular component 2.

From FIG. 3 it emerges that provided rotor 3 is rotated, each point of rotor 3 and piston 4, which is firmly connected to the rotor, will be moved tracing a closed undulated trajectory, with a spread similar to curve ω, (with equal crests and valleys that are geometrically similar to the crests and valleys of the undulated curves α, $\gamma_\alpha/\gamma_\beta$ and β with similarity ratios 2:1 and 2:3, respectively), traced by point 3 of each crest of curve $\gamma_\alpha$ of rotor 3. This motion, in case rotor 3 rotates with a constant velocity, is analyzed in a smooth circular motion with the same frequency and a reciprocal motion between TDC (Top Dead Centre) and BDC (Bottom Dead Centre) with double (generally n-times) frequency.

According to the invention, the edges of the crests and valleys are points or straight sections perpendicular to the longitudinal axis as depicted in FIG. 3, wherein if the edges of the crests and valleys are points, in the case of relative rotational motion of rotor 3 between two annular components 1,3 with constant velocity, results a simple and/or harmonic reciprocation, whereas if the edges of the crests and valleys are straight sections, in the case of relative rotational motion of rotor 3 between two annular components 1,3 with constant velocity, results a reciprocal motion with an inversion delay in TDC and BDC.

Figure 4:
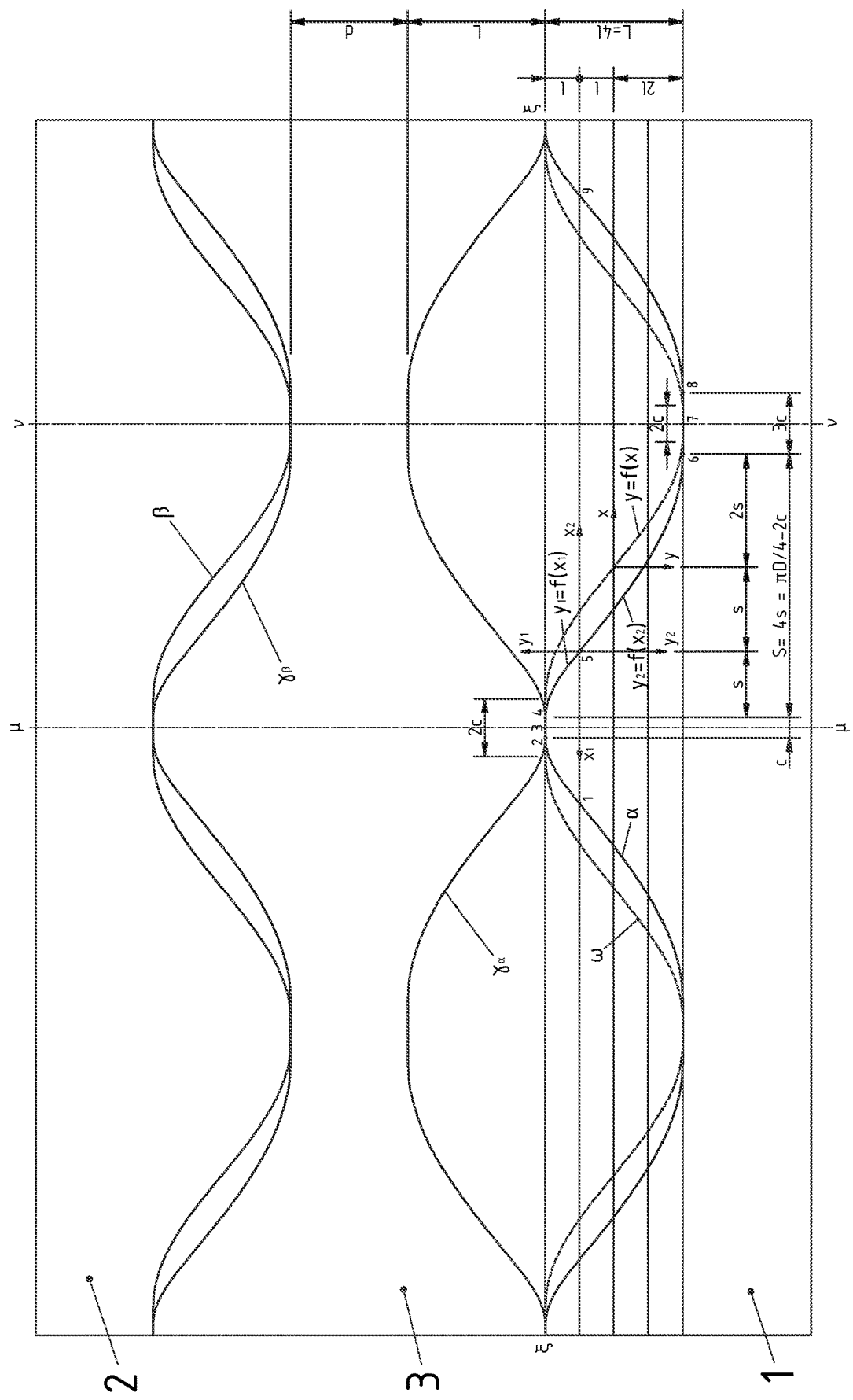

In FIG. 4 spreads are shown of the undulated curves α, $\gamma_\alpha/\gamma_\beta$ and β, respectively, of the external cylindrical surfaces of the first, second and third annular components 1, 3 and 2 of FIG. 2, the only difference being that the third annular component 3 is symmetrical to the plane perpendicular to the longitudinal axis ΔA. In relation to FIG. 3, curves α and $\gamma_\alpha$ are the same and in the same relative and absolute location as those of FIG. 3, on the other hand curves $\gamma_\beta$ and β are the same and in the same relative location as those of FIG. 3, however, in a different position in relation to curves α and $\gamma_\alpha$, resulting in the crests and valleys of the second annular element 3 being symmetric and located opposite crests and valleys, respectively. Also in this particular case, the second annular component 3 may be rotating relative to the first and third annular component 1, 2 continuously contacting, at least at one point, one side of the first and one side of the third annular component 1, 2.

In FIGS. 3 and 4, for curves α, $\gamma_\alpha$ and, in case there is the additional mechanism comprising the third annular component 2, for curves β and $\gamma_\beta$ the following apply:
1. It is about the same smooth, periodic, undulated curve in different locations with number n (natural≠0) of repeated pairs of geometrically similar crests 12345 and valleys 56789 with a similarity ratio of 1:3 (in FIGS. 1, 2, 3 and 4: n=2).
2. Curve $\gamma_\alpha$ is symmetric to a relative to axis ξ-ξ. In FIG. 3 curve β results by the axial displacement (by d) of $\gamma_\alpha$, while $\gamma_\beta$ by axial (L+d) and circumferential displacement by 90° (generally 360°/2n) of a. In FIG. 4 curve β results by the axial (L+d) and circumferential displacement by 90° (generally 360°/2n) of $\gamma_\alpha$, while $\gamma_\beta$ by axial displacement (2L+d) of α.
3. Each crest 12345 is symmetrical relative to axis μ-μ and each valley 56789 relative to axis v-v. The crests and valleys are expressed in the systems of coordinates $x_1$-$y_1$ and $x_2$-$y_2$, with common origin, point 5, and opposite axes, from the similar equations $y_1=f(x_1)$ and $y_2=f(x_2)$, respectively. The crests occupy ¼ and the valleys the remainder ¾ of the total height L of the undulated curves α, β, $\gamma_\alpha$ and $\gamma_\beta$.
4. Sections 234 and 678 may be straight, wherein: 678≥234≥0
5. When crests of one curve enter the valleys of the other, leave free space between their curves, i.e. the size of the crests is smaller than that of the geometric similar valleys with a similarity ratio of 1:3.
6. If the external surface of rotor 3 moves to one direction, while those of the stators 2 and 3 remain motionless, it is proved that curves $\gamma_\alpha$ and $\gamma_\beta$ will remain in continuous contact with curves α and β, respectively, whereupon for point 3 (centre of crest) of curve $\gamma_\alpha$, as well as for every point of the spread of external surface of rotor 3, it is proved that it will move tracing an undulated trajectory like ω, (with equal crests and valleys that are geometrically similar to the crests and valleys of the undulated curves α, $\gamma_\alpha/\gamma_\beta$ and β with similarity ratios 2:1 and 2:3, respectively), with or without straight sections in its crests and valleys (FIG. 3 or 4), as described below in section 9. Curve ω is expressed in the system of coordinates x-y, the point in the middle of height L being the origin and in equal distance from axes μ-μ and v-v, from equation y=f(x) which is similar to equations $y_1=f(x_1)$ and $y_2=f(x_2)$. The total height of curve ω is equal to the total height L of the undulated curves α, β, $\gamma_\alpha$ and $\gamma_\beta$.
7. Referring to FIGS. 3 and 4, two characteristic pairs of equations are mentioned as an example, describing parts 45 and 56 of curve α respectively:

$$y_1 = l \cdot \sin\frac{x_1}{s} \text{ and } y_2 = 3l \cdot \sin\frac{x_3}{3s} \text{ (sinusoidal)},$$

wherein:

$$0 \le \frac{x_1}{s} \le \frac{\pi}{2} \text{ with } 234 = c \ge 0 \text{ and } 0 \le \frac{x_2}{3s} \le \frac{\pi}{2} \text{ with } 678 = 3c.$$

$$y_1 = l \cdot \left(\frac{x_1}{s}\right)^2 \text{ and } y_2 = 3l \cdot \left(\frac{x_2}{3s}\right)^2 \text{ (polyonymic)},$$

wherein:

$$0 \le \frac{x_1}{s} \le 1 \text{ with } 234 = c \ge 0 \text{ and } 0 \le \frac{x_2}{3s} \le 1 \text{ with } 678 = 3c.$$

The coordinates are referring to suitably selected axes of coordinates for each equation, as mentioned above in section 3.

8. In the case of the curves of previous section, trajectory ω traced by each point of the spread of external surface of rotor 3 will be derived, respectively, from equations:

$$a. \quad y = 2l \cdot \sin\frac{x}{2s}, \text{ wherein}: -\frac{\pi}{2} \le \frac{x}{2s} \le \frac{\pi}{s} \text{ (sinusoidal)}.$$

$$b. \quad y = 2l \cdot \left(\frac{x}{2s}\right)^2 \text{ twice, wherein}: 0 \le \frac{x}{2s} \le 1 \text{ (polyonymic)}.$$

The coordinates are referring to suitably selected axes of coordinates for each equation, as mentioned above in section 3.

9. If sections 234 and 678 are straight with a length (precisely) of c and 3c, respectively, between the curved sections of the trajectory or curvilinear motion ω, described by the previous equations of passage 8, interposed equally are equal sections of length 2c, corresponding to equal time intervals of delay in motion inversion in TDC and BDC. A different relation (ratio) of the lengths of sections 234 and 678 poses problems, such as to bring about the insertion of unequal straight sections, i.e. a different motion inversion delay in TDC and BDC, possibly causing problems of timing in multi-cylinder engines. Generally, equal delay time intervals in motion inversion in TDC and BDC result in case the crest edges are straight sections of length c and the valley edges are straight sections of length 3c, respectively.

Remark: In order to achieve a—desirable—smooth periodic undulated trajectory or curvilinear motion ω (of all the points of the external surface of rotor 3) with equal crests and valleys, we specify the undulated curves α, $\gamma_\alpha/\gamma_\beta$ and β, such that the crests and the valleys are similar to the crests/valleys of curve ω with a similarity ratio of 1:2 and 3:2, respectively. Then, rotor 3 rotates and reciprocates smoothly, sliding—continuously contacting—simultaneously both stators 1 and 2, however, this is not true in case the crests of curve ω are not equal to its valleys, because stator 3 motion is blocked.

Definition: We say that a geometric shape $\Sigma_2$ is similar to some other geometric shape $\Sigma_1$ (as regards a common coordinates system), provided that the coordinates of $\Sigma_2$ result from the corresponding coordinates of $\Sigma_1$ by multiplying them with the similarity ratio. The similarity ratio may be greater, lesser or equal to one; therefore we may get enlargement, shortening or equality to $\Sigma_1$, respectively.

Figure 5:
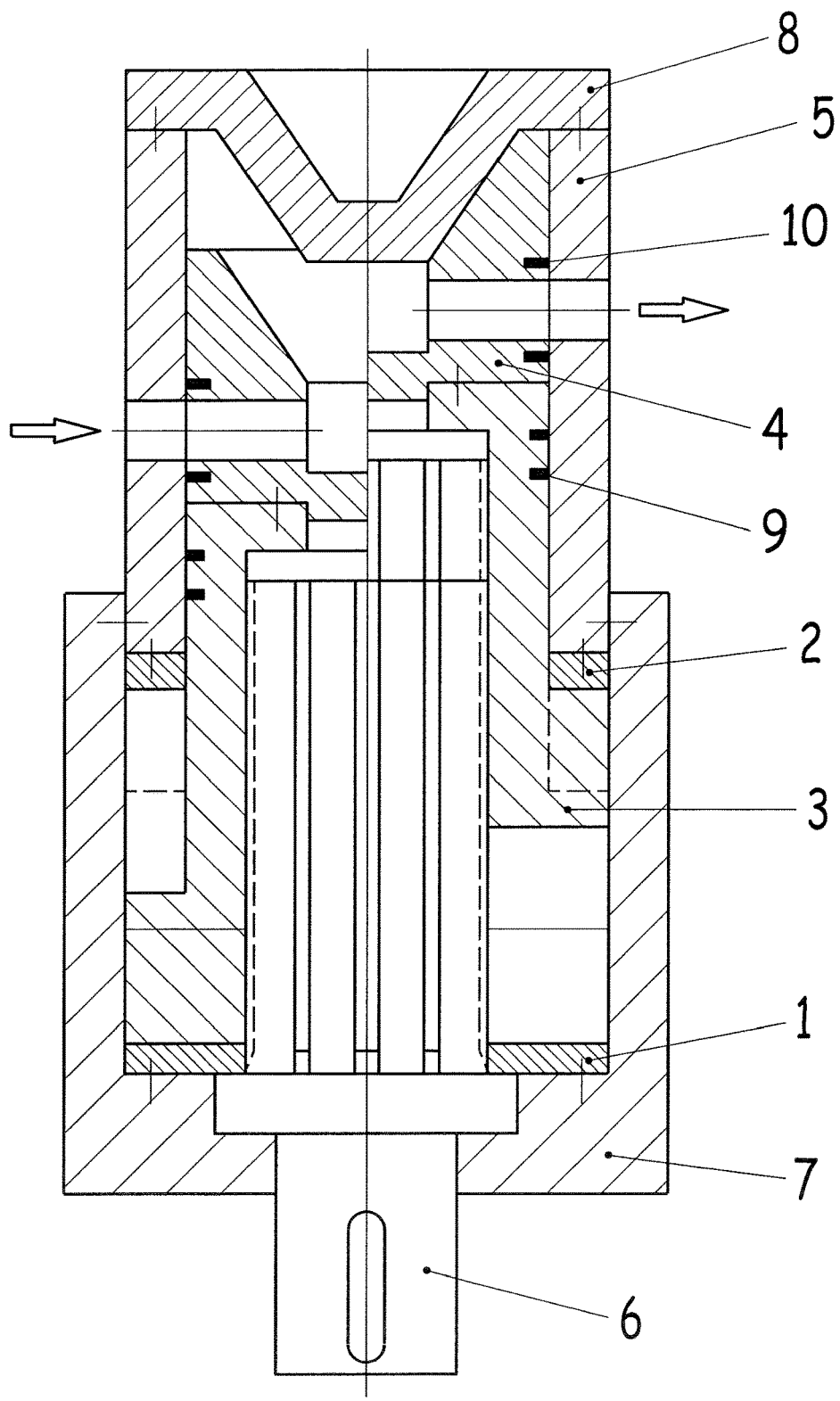
FIG. 5 shows the cylinder of a piston engine having a mechanism of transforming the motion according to the invention, valves with apertures, rotor cooperating with an axle through a spline, plus a piston reciprocating while rotating.
Figure 6:
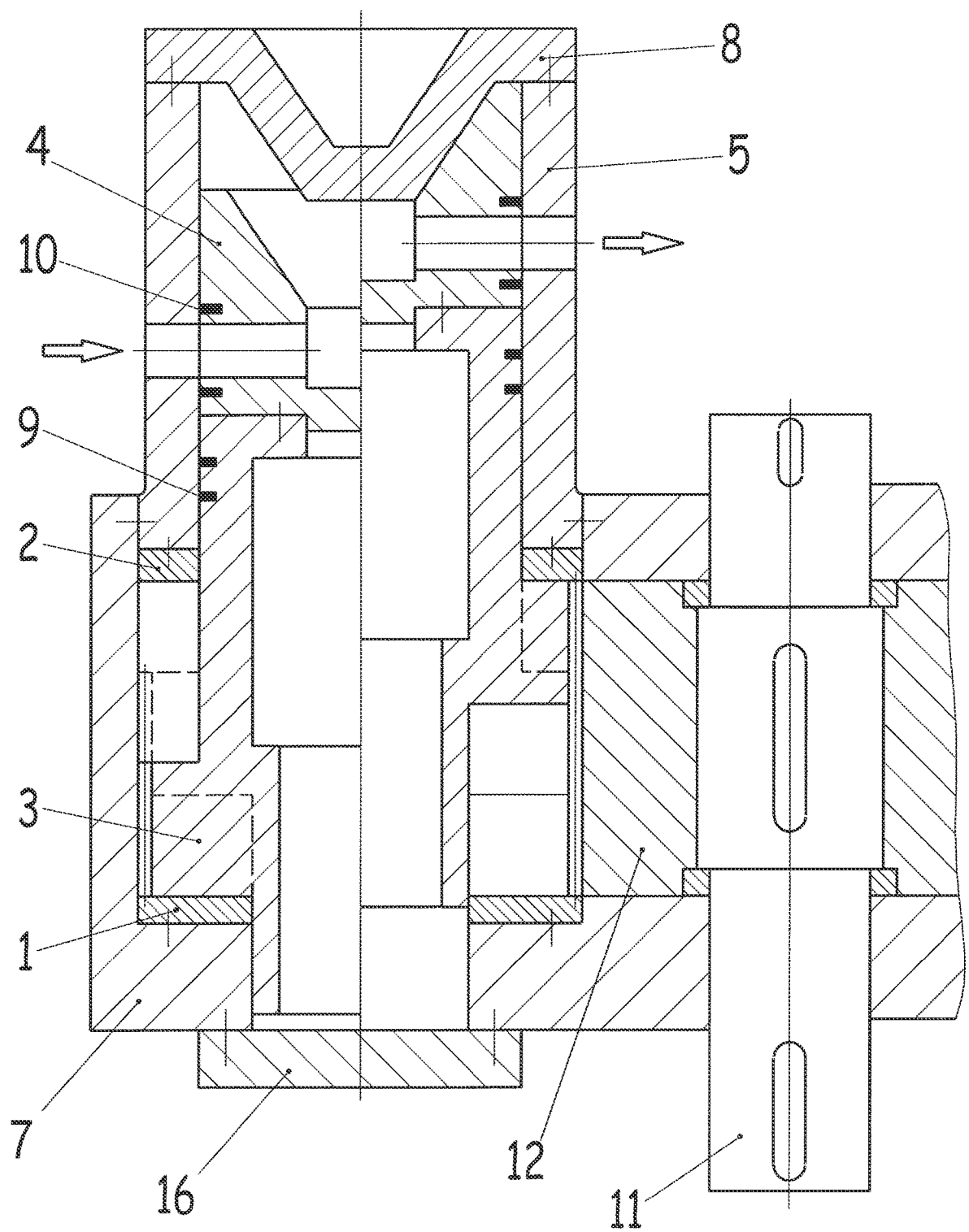
FIG. 6 shows the cylinder of FIG. 5, the difference being that the stator is also a gearwheel cooperating with the rotating axle.
Figure 7:
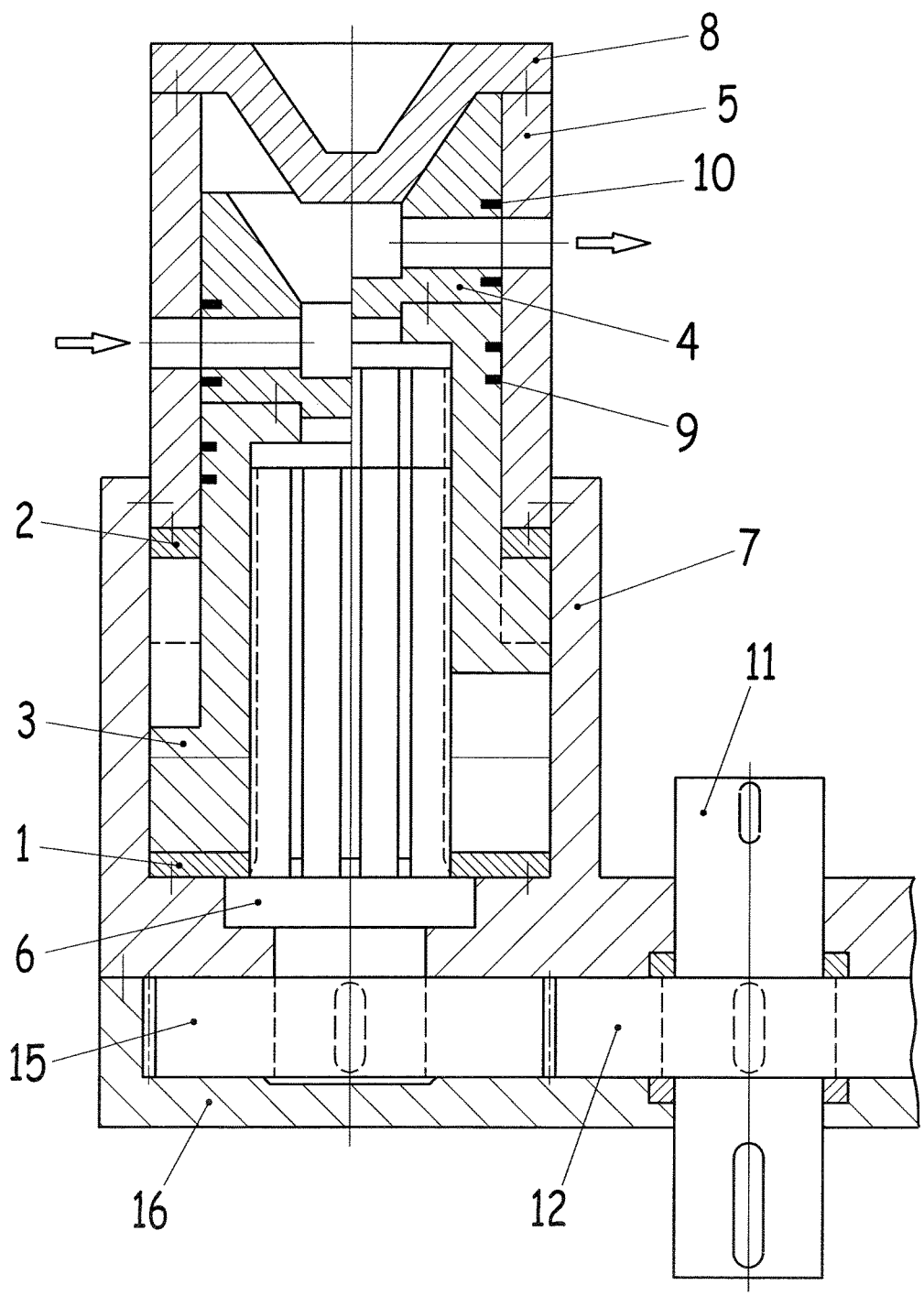
FIG. 7 shows the cylinder of FIG. 5, the difference being that the axle is connected to a gearwheel cooperating with the rotating axle.

FIGS. 5, 6 and 7 show applications in piston engines (motors or pumps/compressors) having an integrated motion transformation mechanism, according to the invention, comprising an additional mechanism with a third annular component 2 and a valve array according to the invention. Said engines comprise one or more cylinders (in parallel and/or opposing arrangement for the neutralization of the inertial forces), wherein the second annular component 3, functioning as rotor, is firmly connected to a cylindrical piston 4 rotating and reciprocating simultaneously. Said engines comprise auxiliary systems (lubrication, refrigeration, fuel, starter etc.) known from the state of the art.

The first and the third annular components 1, 2 operate as stators and are firmly mounted onto a body 7, while rotor 3 is rotating and reciprocating axially according to the invention, moving by means of a spline from an axis 6 coinciding with the axis of the cylinder of the piston engine in FIG. 5, or from axis 6 moving via axle 11 located outside the cylinder, in parallel to its axis, as it arises from FIG. 7, wherein motion is transmitted to the axis through an axle 11 via gearwheels 12, 15. In FIG. 6 motion is transmitted to the rotor by an axle 11 via gear 12 and rack in the rotor external surface 3. The length of the gear rack 12 allows the continuous engagement of the rotor rack 3 as it reciprocates while rotating. Indicator 16 shows a body cover 7.

In FIGS. 5, 6 and 7 the cylinder is supplemented by a cylindrical liner 5, inside which moves—circumferentially contacting—piston 4 covered by a cylinder cover 8. Included also are piston rings 9 and valve spring 10.

In each valve with apertures (one aperture in the liner and one on the piston) of the type of the present invention, one aperture is circular and the other oblong, when fluid is uncompressed. In addition, in applications wherein there are piston hydraulic engines or pumps/compressors and 2-stroke ICEs, the number of valve apertures (both suction and compression) of the type of the present invention is double the number n of crests/valleys, whereas the number of valves of 4-stroke ICEs is equal to n.

Figure 8:
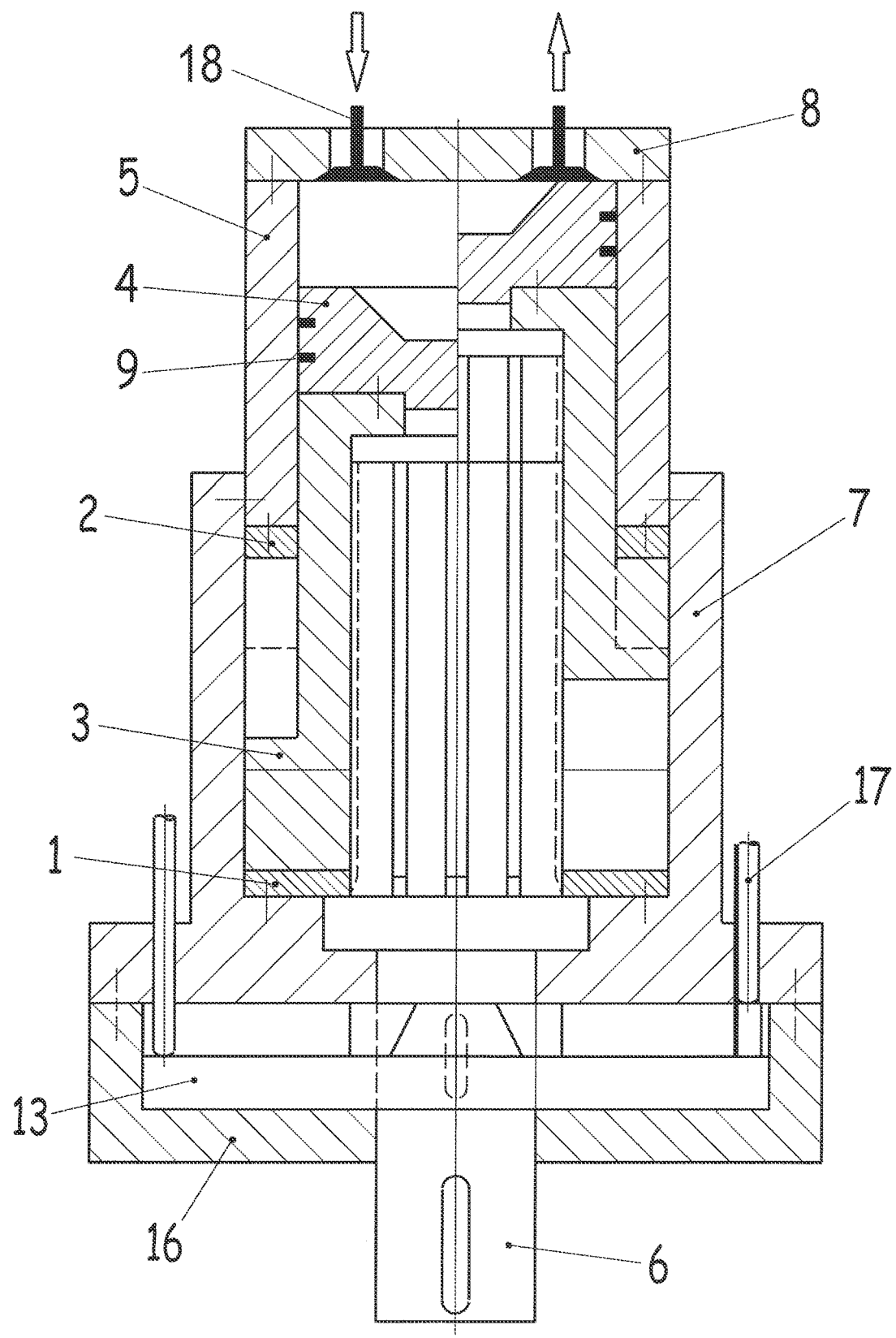
FIG. 8 shows the cylinder of an internal combustion piston engine having a mechanism of transforming the motion according to the invention, conventional valves, rotor cooperating with the axle through a spline, disc-shaped cam on the axle plus a piston reciprocating while rotating.
Figure 9:
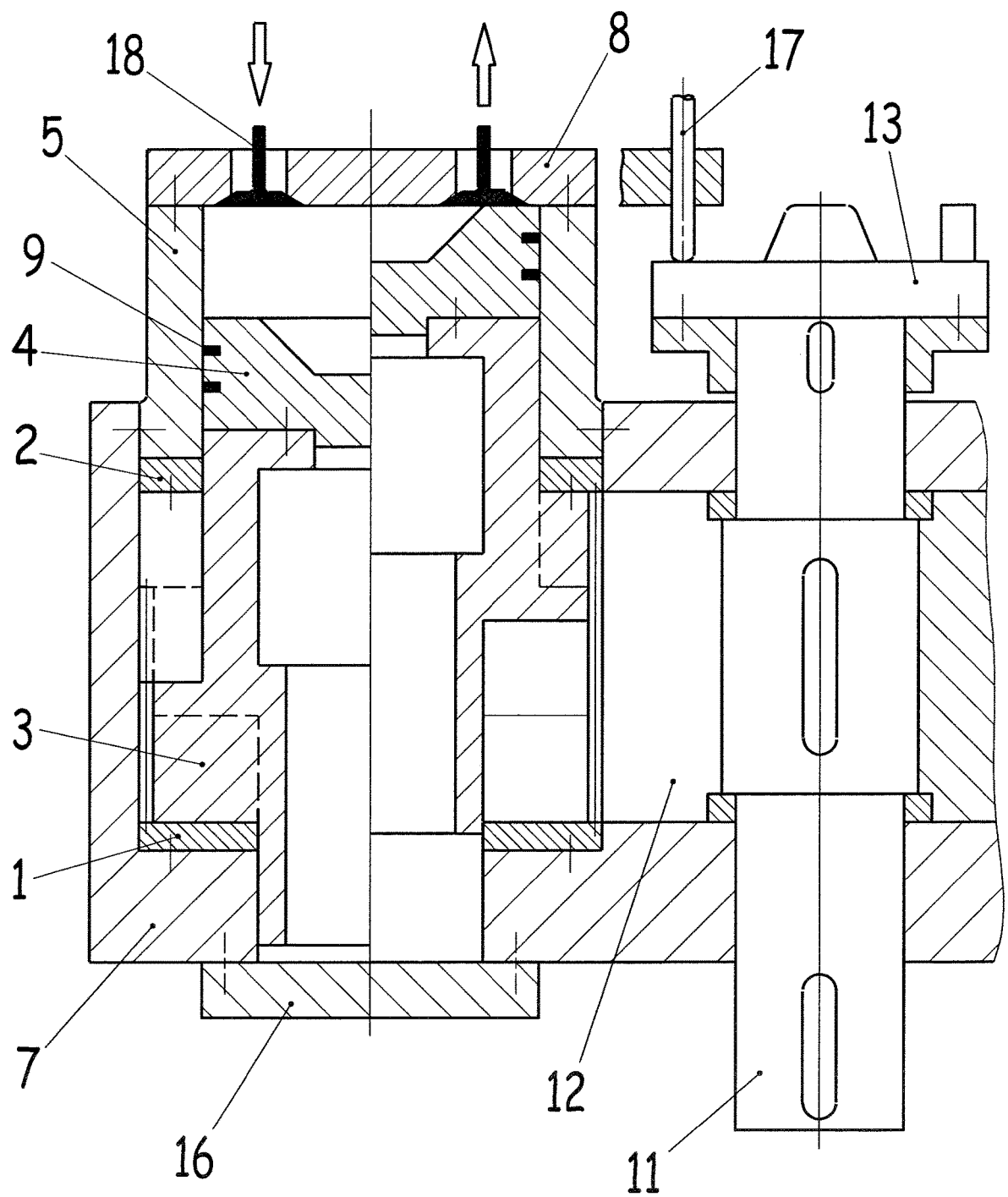
FIG. 9 shows the cylinder of FIG. 8, the difference being that the stator is also a gearwheel cooperating with the rotating axle.
Figure 10:
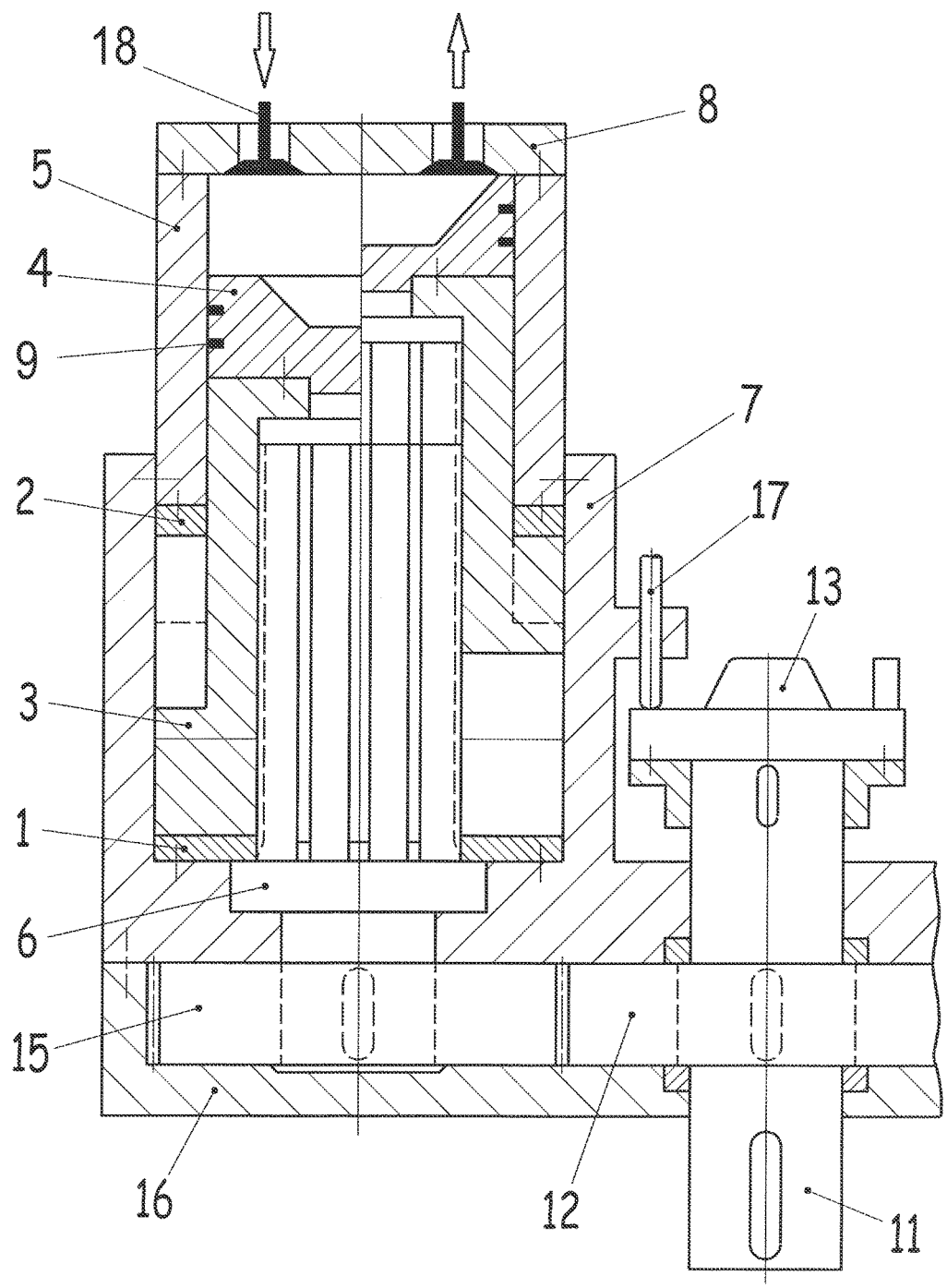
FIG. 10 shows the cylinder of FIG. 8, the difference being that the axle is connected to a gearwheel cooperating with the rotating axle.

In FIGS. 8, 9 and 10 applications are shown in piston engines (motors or pumps/compressors) with an integrated motion transformation mechanism according to the invention including additional mechanism with a third annular component 2, wherein the second annular component 3 functioning as a rotor is firmly connected to piston 4 rotating and reciprocating simultaneously in combination with conventional/classic valves 18. Said engines are constituted by one or more cylinders (in parallel and/or opposing arrangement, for the neutralization of the inertial forces) with a common axle 11 and auxiliary systems (lubrication, refrigeration, fuel, starter etc.) from the state of the art.

FIG. 8 differs from FIG. 5 in that the valve arrangement according to the invention has been replaced by conventional/classic valves 18. A disk-shaped cam 13 can be distinguished fitted directly above axis 6 plus rods 17 required in case of an ICE.

FIG. 9 differs from FIG. 6 in that the valve arrangement according to the invention has been replaced by conventional/classic valves 18. A disk-shaped cam 13 can be distinguished fitted directly above axle 11 plus rods 17 required in case of an ICE.

FIG. 10 differs from FIG. 7 in that the valve arrangement according to the invention has been replaced by conventional/classic valves 18, while in the case of an ICE a disk-shaped cam 13 fitted directly above axle 11 and rods 17 are provided.

Figure 11:
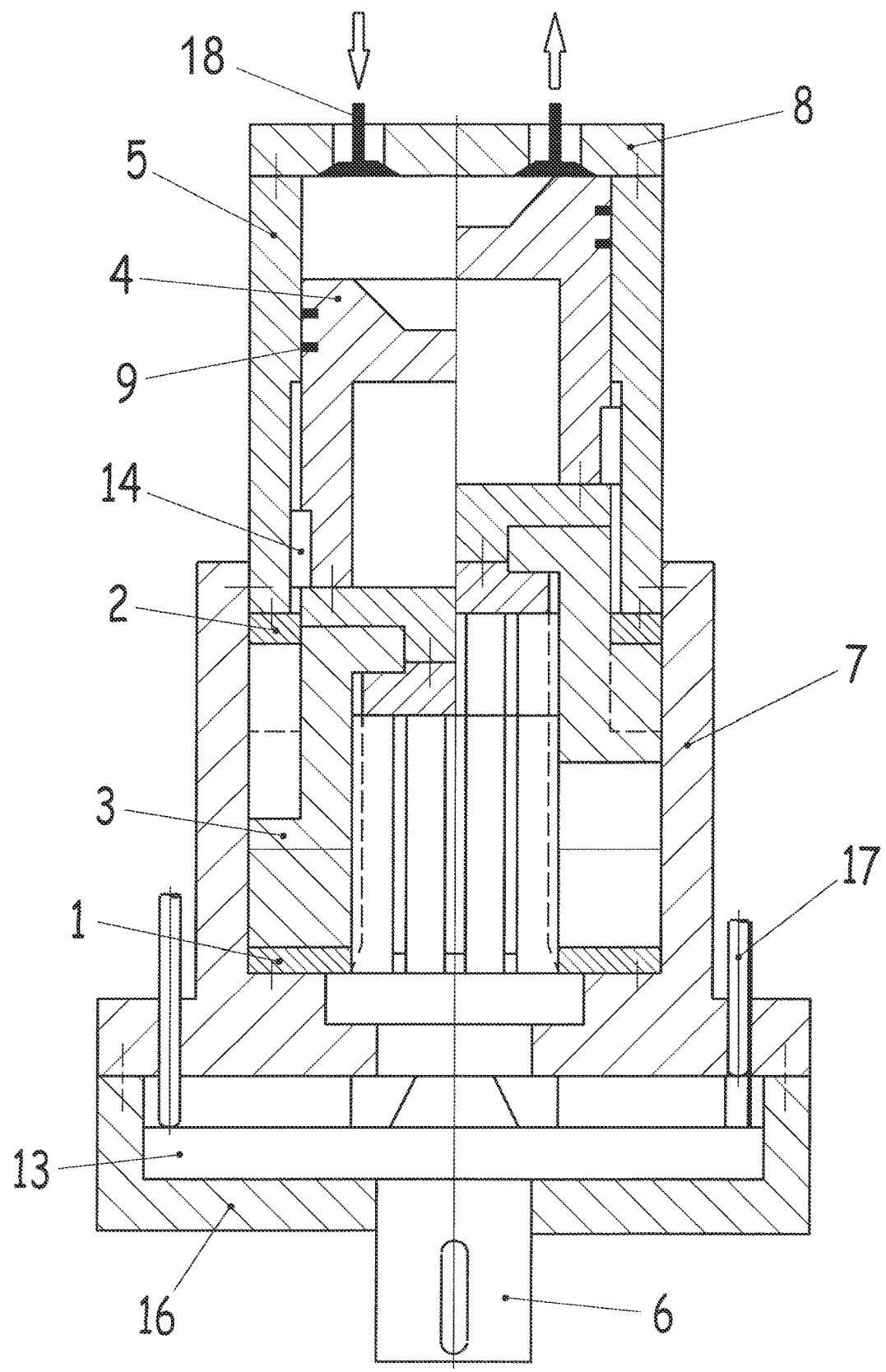
FIG. 11 shows the cylinder of FIG. 8, the difference being that the piston reciprocates without rotating.
Figure 12:
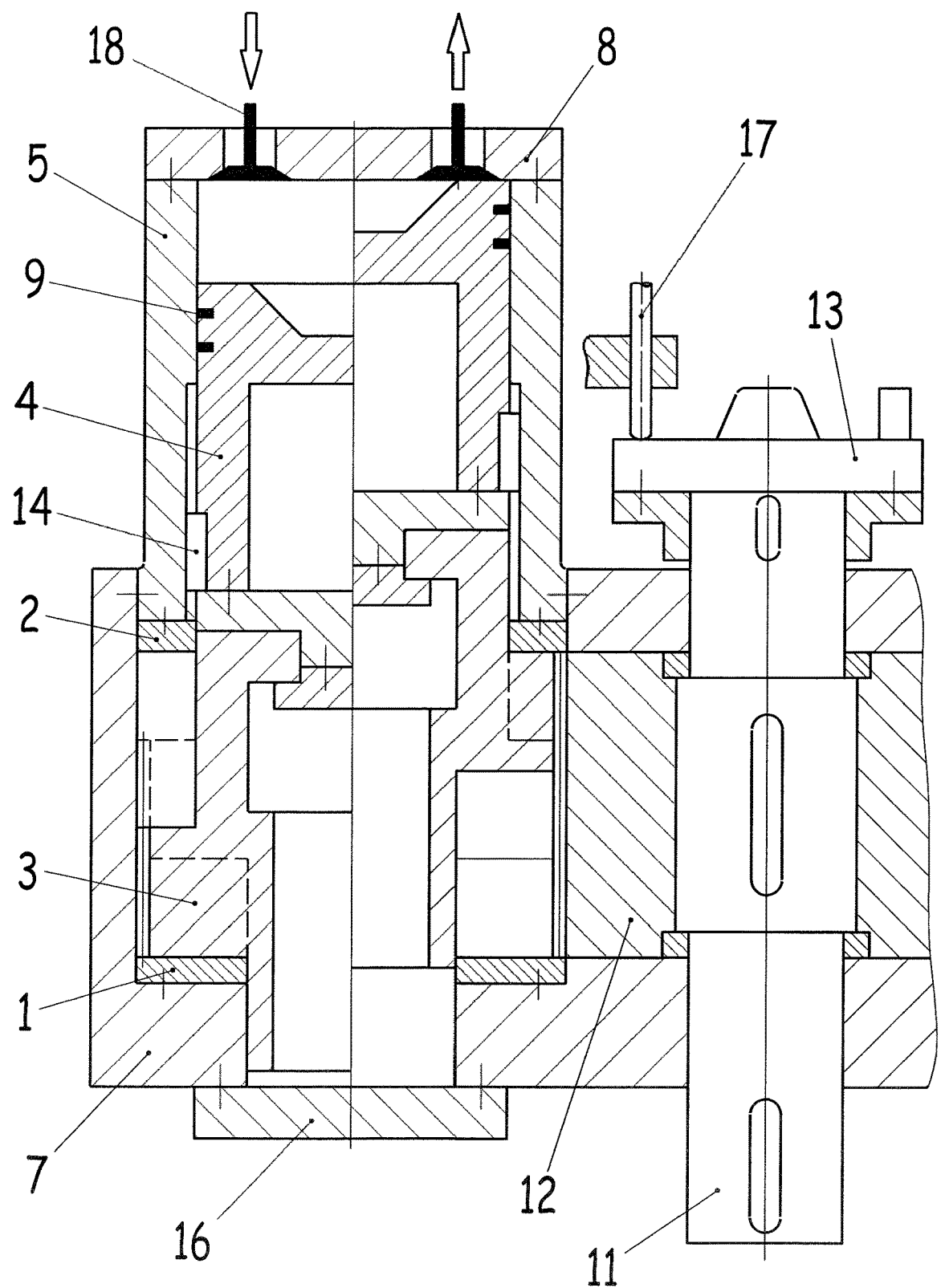
FIG. 12 shows the cylinder of FIG. 9, the difference being that the piston reciprocates without rotating.
Figure 13:
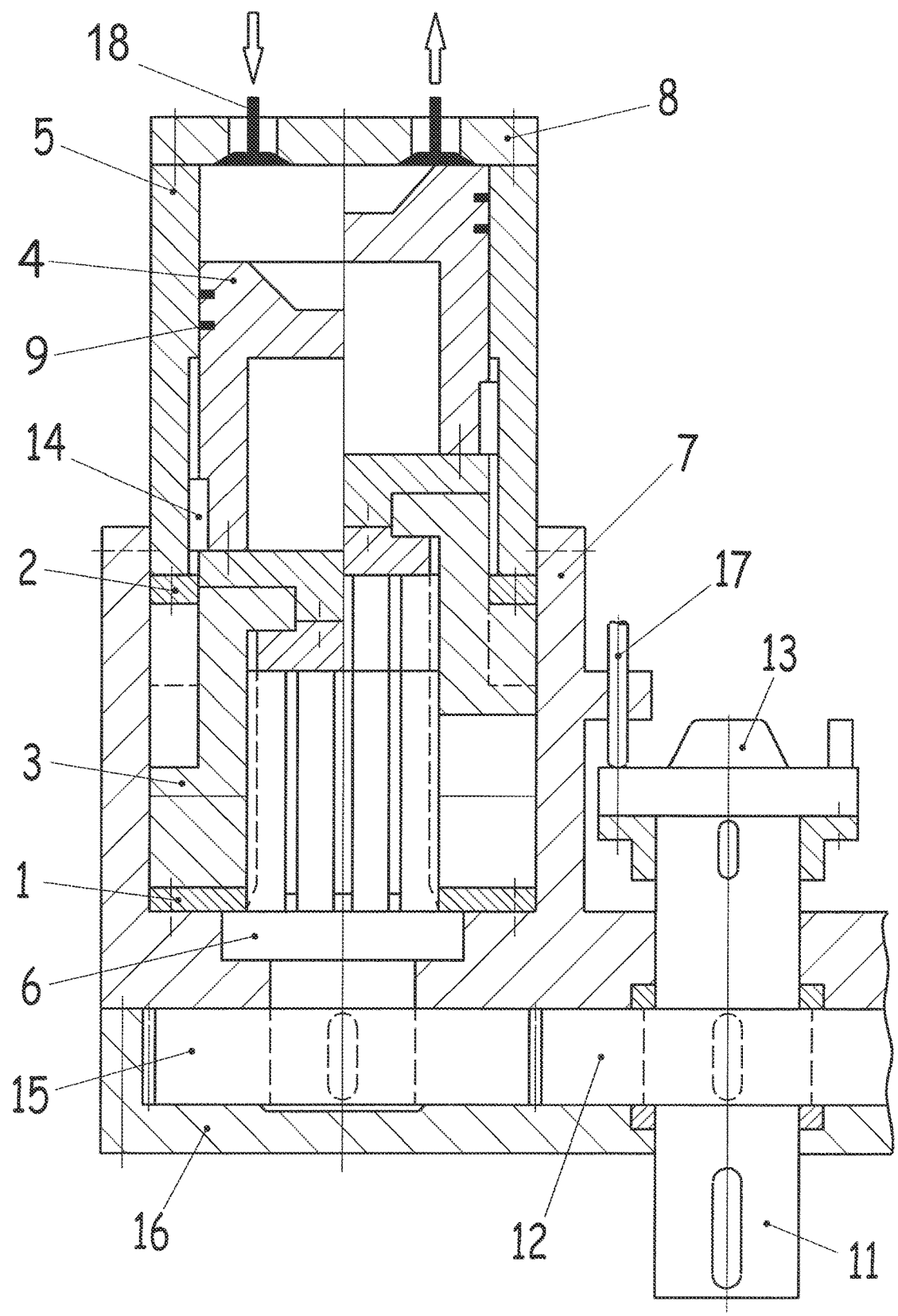
FIG. 13 shows the cylinder of FIG. 10, the difference being that the piston reciprocates without rotating.

FIGS. 11, 12 and 13 differ from FIGS. 8, 9 and 10, respectively, in that piston 4 is connected in such a way to rotor 3 so as to be free not to follow the rotation of rotor 3, causing the rotation of axis 6 or axle 11, and to execute only reciprocating motion inside liner 5. This is achieved through linearly sliding elements 14 (wedges, balls etc.).

Since the piston executes reciprocating motion only inside liner 5, the mechanism described may be combined only with conventional/classic valves 18 and, in case of (ICEs), with a disk-shaped cam 13 fitted directly above axis 6 or axle 11, plus rods 17.

Figure 14:
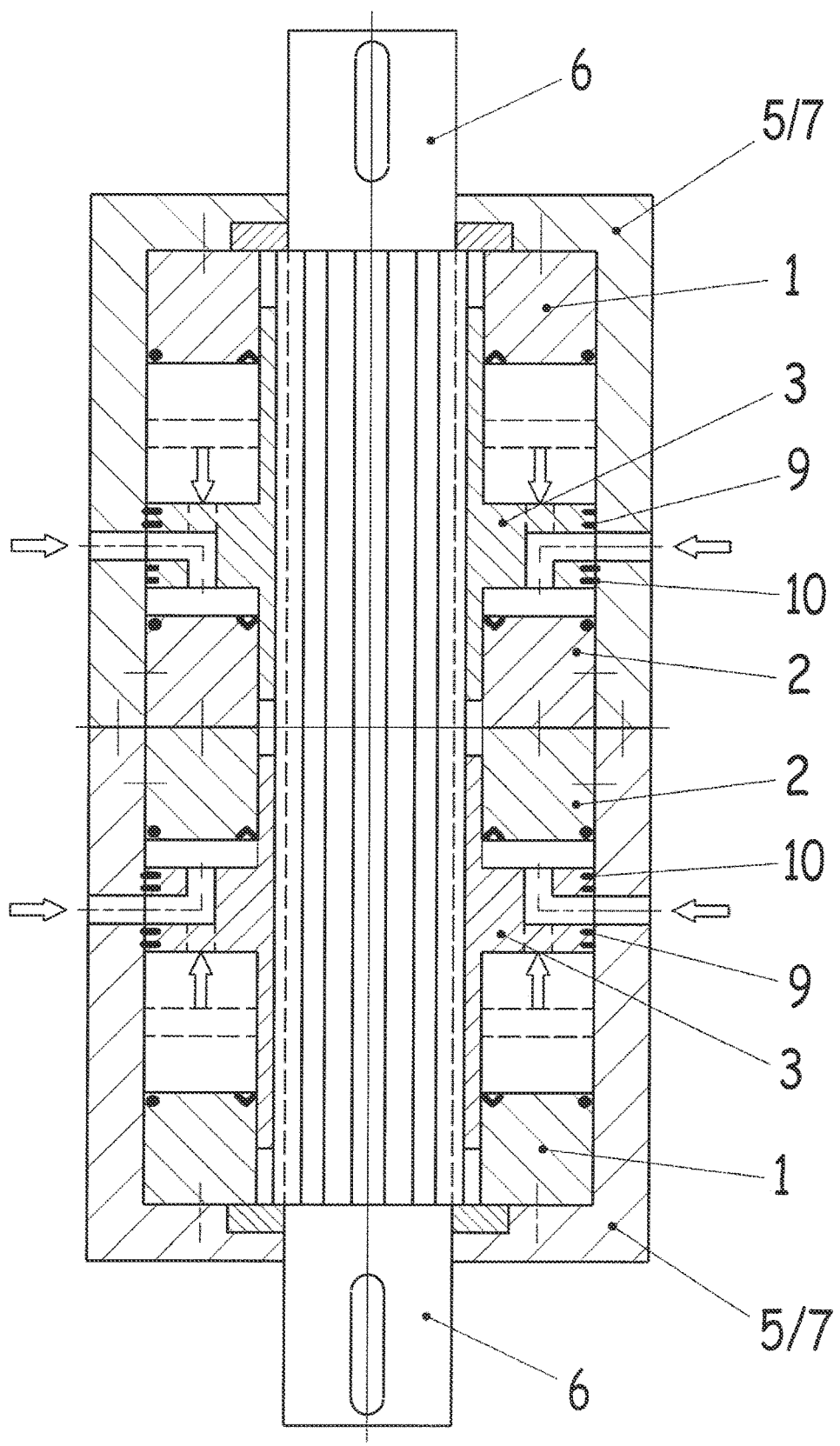
FIG. 14 shows a mirror-image symmetric, two-cylinder, double-effect piston engine, with a motion transformation mechanism according to the invention, valves with apertures or conventional, rotor cooperating with an axle through a spline, wherein the rotor is also a substitute for the piston, since the working fluid operates between the two stators, the rotor and a cylindrical body.

In FIG. 14 another application of a double-effect piston engine (engine or pump/compressor) according to the present invention, wherein the working fluid operates between stators 1 and 2, rotor 3 and a cylindrical liner-body 5/7. Specifically, a double-effect, two-cylinder piston engine is shown, with a motion transformation mechanism, valves with apertures or conventional, rotor 3, rotation on axis 6 with a sliding spline, wherein the role of the piston is effected by rotor 3, since the working fluid operates between the two stators 1 and 2, rotor 3 and cylindrical liner-body 5/7.

As in FIGS. 5 to 13, the engine may function, with simple apertures as valves according to the invention on the stator 3 and the liner-body 5/7, but also with various types of conventional/classic valves above the liner-body 5/7.

In order to neutralize the inertial forces, the indication is to combine, as in FIG. 14, two opposing stators 3 with the corresponding stators 1 and 2 in the same liner-body 5/7, or to combine suitably more cylinders, as in FIGS. 15.a to 15.h. In this application, the cases of 2-stroke ICEs, hydraulic motors and pumps/compressors are of particular interest.

The engines presented in FIGS. 5 to 14 execute in each of their rotation so many reciprocations as the number n of crests/valleys existing in each undulated surface of stators 1, 2 and rotor 3. The case in which n=1 is infrequent due to the emergence of asymmetric internal forces causing friction forces between piston 4 and liner 5 and relative wear. Usually n=2, thus in 4-stroke ICEs embodying the present invention, each operation cycle is completed in one rotation versus two rotations in the conventional ICEs. This has as a result the doubling (roughly) of power for the same cylinder capacity engines. The effect is opposite—in combination with the absence of piston rod and classic camshaft—in the size/weight of the engine: it is decreased (roughly) by 50% for the same power output. The above apply and are generalized accordingly for n>2.

The same also holds in 2-stroke ICEs wherein once again the power is doubled or the size/weight is decreased by half compared to the conventional 2-stroke engines for the same cylinder capacity or power, respectively.

Finally, in all ICEs incorporating the present invention and using a disk-shaped cam, the absolute control is made feasible of the stroke, timing and duration of activation of the conventional/classic valves, owing to the fact that there are no restrictions in choosing the position and configuring the shape and size of the cams.

In FIGS. 15.a to 15.h, arrangements are shown based on the applications corresponding to FIGS. 5 to 14, wherein absolute neutralisation is achieved of the inertial forces resulting from the reciprocating masses of rotor 3 and piston 4 without balancing: the arrows show the relative motion in the various cylinders. Whenever it is feasible, the combustion is carried out consecutively in the various cylinders and shared equally in each rotation of axle 11, for reasons of smoothening-out power flow.

Specifically, in FIGS. 15.a to 15.h the following interesting cases are set out:
 a. 2 cylinders placed in opposing arrangement, with the working fluid chambers at the ends, and with a power output from a parallel axle with two output positions. The specific arrangement constitutes a simple unit of autonomous operation (SUAO) with the reciprocating inertial forces balanced completely.
 b. 2 cylinders placed in opposing arrangement, with the working fluid chambers unified or not in the centre, and with a power output from a parallel axle with two output positions. In ICEs, the unified chambers case is at a disadvantage relative to the separate chambers case, due to half of the combustions talking place, resulting in greater fluctuations in the power flow curve. This arrangement constitutes another version of a simple unit of autonomous operation (SUAO).

c. 4-Cylinder or multi-cylinder engine composed by units from case 15.a for smoother operation, and/or greater power with a single output.
d. 4-Cylinder or multi-cylinder engine composed by units from FIG. 15.b for smoother operation, and/or greater power with a single output.
e. 4 Cylinders arranged in parallel on the same level, with two power outputs constituting the extension of axes 6.
f. 4 Cylinders arranged in parallel on the same level, with a parallel power output at the centre with two ends.
g. 4 Cylinders arranged in parallel and in a circle (every 90°), with a parallel power output at the centre with two ends.
h. 4 Cylinders arranged in parallel and in a circle (crosswise), with a parallel power output at the centre with two ends.

Moreover, for the applications of FIGS. 5 to 14, the following remarks are in effect:

1. The working fluid operates inside liner 5, between the free surface of piston 4 and cover 8.
2. In FIGS. 5, 7, 8, 10, 11, 13 and 14, axis 6 coincides with the cylinder axis.
3. In FIGS. 6, 9 and 12, axle 11 is positioned outside the cylinder, in parallel to its axis. The motion from axle 11 to rotor 3 is transmitted via gear 12 and rack on the rotor 3 external surface. Reverse applies as well. The length of the gear rack 12 allows the continuous engagement of the rotor rack 3 as it reciprocates while rotating.
4. In FIGS. 8 and 11, wherein conventional valves 18 are used, the disk-shaped cam 13 is positioned onto axis 6.
5. In FIGS. 9, 10, 12 and 13, wherein conventional valves 18 are also used, the disk-shaped cam 13 is positioned onto axle 11, and on its disk it bears only one set of cams. These cases are recommended for multi-cylinder engines provided that the cylinders are arranged in parallel and an equal distance (circularly) round the single axle 11 (see FIGS. 15.g and 15.h).
6. In FIGS. 7, 10 and 13, axle 11 is driven by axis 6 via a pair of gearwheels 12 and 15. Reverse applies as well.
7. In FIGS. 8 to 13, when reference is made to applications in piston hydraulic motors or pumps/compressors, suitable conventional/classic valves are used according to the specific configuration. Valves, piston-rods and the crankshaft disk (referring to ICEs) are abolished.
8. In FIGS. 5, 6, 7 and 14, when reference is made to applications in piston hydraulic motors or pumps, in each pair of valves with apertures (present invention type) one is circular and the other oblong, when the fluid is uncompressed.
9. In FIGS. 5, 6, 7 and 14, when reference is made to applications in piston hydraulic motors or pumps/compressors and 2-stroke ICEs, the number of valve apertures (present invention type) is double that of the no. of valves in 4-stroke ICEs.
10. In FIGS. 5, 7, 8, 10, 11, 13 and 14 rotation and the simultaneous reciprocation of rotor 3 are achieved with a spline above axis 6, whereas in FIGS. 6, 9 and 12 via gearwheel 12 and external rack on rotor 3.

In the cases described by means of the illustrations of FIGS. 5 to 14, the transformation of rotational to reciprocating motion and vice versa is carried out due to the sliding of surfaces $\Gamma_\alpha$ and $\Gamma_\beta$ of the second annular component 3, which may also function as a rotor, onto surfaces A and B, respectively, of the first and third annular components 1 and 3, which may function as stators, as shown in FIGS. 2, 3 and 4. The same result emerges also in case surfaces $\Gamma_\beta$ and B are eliminated and the second annular component 3 is forced to be pushed onto the first annular component 1, in order for surface $\Gamma_\alpha$ to be in continuous contact with A. This may be achieved e.g. in the following ways replacing the third annular component 2:

1. Using spring(s) exerting pressure on rotor 3, in combination with bearings, except in special cases (as in the case of FIG. 20).
2. With two diametrically opposed rollers, mounted on rotor 3, rolling onto a suitable undulated surface formed on stator 2, similar to surface B (FIG. 2), in order for the axes of the rollers to trace curve ω of FIG. 3 or 4.
3. Using pressure (hydraulic or pneumatic) on rotor 3.
4. Using an arrangement of magnetic/electromagnetic force on rotor 3.
5. Using the force of gravity (only for engines with vertical cylinders).

Finally, the present invention applies to all kinds of engines and automations wherein transformation of rotational to reciprocal motion or the reverse is taking place, such as in mechanical presses, nail making machines, sewing machines, printing machines etc.

In FIG. 16.a the arrangement of a clutch is shown comprising a first annular component 1 connected to axis 6 with an axially slipping spline, a component (secondary axis) 4 connected firmly to the second annular component 3, at the same time a special mechanism, according to the state of the art, may exert an axial force F on the first annular component 1 and forces its crests to enter the valleys of the second annular component 3. In this condition the rotation of axis 6 is transferred totally to the secondary axis 4. If the axial force F on the first annular component 1 is lifted, it will recede and disengage from the second annular component 3, in which case the transfer of rotation from axis 6 to secondary axis 4 will be interrupted.

In FIG. 16.b a more effective clutch arrangement is shown, wherein axis 6 is connected via a sliding spline to rotor 3, i.e. with the second annular component, stator 2, i.e. the third annular component, is connected firmly to component (secondary axis) 4, on the other hand in this initial position/condition rotor 3 slides simultaneously and moves freely between stators 1 and 2, without affecting their kinematic condition. Moreover, a special mechanism, according to the state of the art, may exert an axial force F on stator 1, forcing the first and third annular components 1 and 2 to approaching sufficiently each other. In this new condition, rotor 3 is immobilized between stators 1 and 2; therefore the rotation of axis 6 is transferred in full effect to the secondary axis 4. If the axial force F on stator 1 is lifted, by the special mechanism, it will recede to its initial position/condition, rotor 3 will be released and start moving again by sliding between stators 1 and 2, and the transfer of rotation from axis 6 to secondary axis 4 will be interrupted.

Optionally, stators 1 and 2 are connected externally to a liner 7: the first with axially sliding wedges 14, and the third enabled to rotate only slightly.

The special mechanism exerting force F enjoys wide application in the current state of the art, it may be somewhat equivalent to the mechanisms encountered in the clutches of all sorts of vehicles (cars, trucks, tractors etc.) and it may work mechanically and/or hydraulically, and/or pneumatically etc.

A feature/advantage of such a clutch is the simple and compact construction, but mainly, the transfer of motion with mechanical engagement, not friction, resulting in the (almost complete) lack of wear, on account of the absence of friction during the sliding action of the cooperating parts, due to the hydrodynamic lubrication thereof.

In FIG. 17.a an arrangement for a differential is shown, comprising two mirror-image symmetric sections, each one of them consisting of a first annular component 1 and a second annular component 3 connected to an axis 6 with a sliding spline. A special mechanism, according to the state of the art, exerts force F on the first annular component 1 and keeps it engaged with the second annular component 3. Each one of the two annular components 3 is connected firmly to a gearwheel 15 moving through axis 11 via the cooperating gearwheel 12. As long as the resistance of two the axes 6 in motion is the same, the first annular components 1 remain engaged with the second annular components 3, and the rotation of gearwheel 15 is transferred to its full effect to axes 6. Should the resistance grow in one of the axes 6, the corresponding first annular component 1 will recede and the no. of rotations of the corresponding axis 6 will be decreased, at the same time the other axis 6 will continue moving normally until equilibrium in the resistances of their axes 6 returns, and previous operation is restored. That is to say, the arrangement functions as a simple differential. In order to avoid the disadvantage of the immobilization of one axis 6 and the rotation of only the other one, in case the resistance of the latter is zero, it is imperative that control of forces F and rotations of axes 6 is exercised by means of electronic assistance. In this case both axes may be blocked completely and both axes may be rotating with the same speed: limited slip differential "LSD".

In FIG. 17.b a more effective differential arrangement is provided as a combination of the arrangements presented in FIGS. 16.b and 17.a, the combined descriptions of which provide the operating mode of this particular type of differential. The differential arrangement comprises two mirror-image symmetric sections, each one consisting of the second annular component 3, functioning as a rotor, connected to an axis 6 by means of a sliding spline, a first annular component 1 and a third annular component 2. In this initial position/condition rotor 3 slides, and at the same time moves freely, between stators 1 and 2 without affecting their kinematic condition. A special mechanism, according to the state of the art, exerts a force F on the first annular component 1 moving to the third annular component 2, entrapping and immobilizing second annular component 3 between the first and the third component 1 and 2, such that the third annular component 2 is engaged firmly and moving simultaneously to axis 6. The two mirror-image symmetric sections are connected firmly via third annular components 2 to a gearwheel 15, moving from one axis 11 via a cooperating gearwheel 12. The operation of the arrangement as a differential is determined by the entrapping and immobilization or not of the second annular component 3. Thus, for as long as the resistance of two axes 6 during motion is the same, the second annular components 3 remain in engagement with the third annular components 2 and the rotation of the gearwheel 15 is transported to its full effect to axes 6, on the other hand if the resistance grows on one of the axes 6, the corresponding first annular component 1 will recede slightly, the corresponding second annular component 3 will be released and it will begin to slide simultaneously and to move freely between the first and the third annular components 1 and 2, thus the no. of rotations of the corresponding axis 6 will decrease until the balance of the axes 6 resistances is restored, and the arrangement returns back to its initial position/operating condition.

Optionally, the first annular component 1 is connected to a body 7 via the use of axial sliding 14, and the third annular component 2 is connected to body 7 having the capability of slight circumferential sliding.

The special mechanism of exerting force F, just as in the differential arrangement applications of FIGS. 16.a and 16.b, may operate mechanically and/or hydraulically, and/or pneumatically etc., with or without electronic assistance.

A feature/advantage of such a differential is the simple and compact construction, but mainly, the transfer of motion via mechanical engagement, not friction, resulting in the (almost complete) lack of wear, owing to the absence of friction during the sliding action of the cooperating parts, because of the hydrodynamic lubrication thereof, as well as the ability to operate as an "LSD" differential.

In FIG. 18.a a first mechanism for the transformation of rotational to reciprocal motion or vice versa is shown, according to the present invention, with $n=n_1$ number of crests and valleys, wherein a first and a third annular component 1 and 2 function as stators and are mounted firmly on a body 7, while the second annular component 3 is moved by an axis 6 with a sliding spline and functions as a rotor firmly connected to a piston 4 turning and reciprocating axially, connected coaxially via a pin 19 to a second similar mechanism, with the same reciprocation path L and a number of crests and valleys $n=n_2 \neq n_1$, via pistons 4 in such a way as to allow for rotation relative to each other, however, not axial displacement. In this case, if axis 6 of the first mechanism rotates with $N_1$ rotations, then axis 6 of the second mechanism will be rotating with $N_2=N_1\times(n_1/n_2)$ rotations, i.e., the pair of mechanisms functions as a rotation speed increasing-reducing device.

In FIG. 18.b, respectively, axes 6 of the two mechanisms are connected coaxially via wedges 14 of a coupler 20 in a fixed way, therefore the pair of mechanisms functions as a reciprocating speed increasing-reducing device. In the latter case, it may function also and/or as a reciprocation-path length increasing-reducing device L, provided the reciprocation-path length $L_1$ of the first mechanism differs from the reciprocation-path length $L_2$ of the second.

A feature/advantage of such an increasing-reducing device is the in-line (coaxial) arrangement and the capability, in addition to increase/reduce the no. of rotations, to achieve the increase/reduction of the no. of reciprocations as well, with or without altering the path length.

FIG. 19 shows the coupling of an electrical engine (power generator/electric motor) with two similar engines M (motors or pumps/compressors, respectively) as those described in the applications reported in FIGS. 5, 8 and 11 of the present invention. The bodies of engines M are mounted coaxially onto the body (stator) of the electrical engine E: one on the right and the other on the left. The rotor axis of the electrical engine E is abolished and it is substituted by axes 6 of engines M, and in doing so they get synchronized relative to each other, resulting in operating with pistons moving in opposing directions in order for the inertial forces of reciprocation to balance out. This type of coupling corresponds to FIG. 15.a, however it offers an advantage over it, since the parallel axis is absent, having been substituted by the electrical engine rotor.

A feature/advantage of such an electromechanical pair is its simplicity, the particularly small size/weight, the high power concentration and the compactness (compact) of the construction compared to other conventional cases.

In FIGS. 5 to 14, the described engines of the present invention may function as 2-stroke petrol engines with clean fuel (no lubricant addition). Fuel injection with spraying is required, input of air using a compressor (turbo), a construction allowing the delay of motion inversion in TDC and BDC according to the present invention, and valves with apertures according to the present invention, or controlled by a disk-shaped cam, and regulated (a possibility also provided by the present invention) to operate in the following order: as soon as the expansion phase is completed and just before the piston reaches BDC, the output valve opens and most of the exhaust gases escape, then the input valve opens and the incoming air under pressure forces out the remainder of the exhaust gases (sweeping/flushing), the outlet valve closes followed by the inlet valve once the cylinder is filled with air, and motion inversion starts towards TDC. Next come compression phase, injection, ignition and combustion of the fuel and, finally, expansion, and a new identical cycle starts all over again.

A feature/advantage of such a 2-stroke petrol engine is its small size/weight, roughly half that of a conventional 2-stroke petrol engine of the same power output, plus its non-polluting operation, i.e. the emission of exhaust gases comparable quality-wise to those of a 4-stroke petrol engine, contrary to the polluting exhaust gases of the conventional 2-stroke petrol engines.

The described engine may also operate the same way as a diesel engine.

In both cases (petrol engine or diesel engine) its size/weight is roughly one quarter the corresponding conventional 4-stroke engine size/weight.

In FIG. 20 the application of a mechanism in a two cylinder piston engine is shown, corresponding to that of FIG. 15.$a$, wherein the cylinders are coaxial, mounted in a mirror-image arrangement, with two components 4 moving in opposing directions—functioning as pistons—for balancing the inertial forces of reciprocation and characterized in that each cylinder operates with a pair of annular components with undulated surfaces transforming motion on their adjacent sides, according to the present invention, and their continuous contact ensures a force being exerted continuously onto the piston, as it moves from TDC to BDC and vice versa.

More specifically, in FIG. 20, each cylinder comprises a first annular component 1 functioning as stator, a second annular component 3 functioning as rotor connected firmly to a piston 4. The stators 1 are connected firmly between them and with a common body 7. Each rotor 3 carries an external rack cooperating with a gearwheel 12 mounted on a common axis 11, parallel to the longitudinal axis of the cylinders. Gearwheels 12 synchronize rotors 3 and transfer motion to axis 11. A force is exerted on pistons 4, as they move between TDC and BDC, which is due to the pressure of the working fluid and/or the assistance of a pulling spring 21, keeping the undulated surfaces of rotors 3 in contact with the corresponding stators 1. The pulling spring 21 connects pistons (4) between them through apertures in the stators 1, therefore it acts assisting their recovery, holding rotors 3 in continuous contact with the corresponding stators 1, a fact particularly important during the period of time the engine is not operating, thus avoiding its detuning. Each cylinder comprises valves according to the invention or conventional/classic valves 18, in combination with a disk-shaped cams 13, and rods 17. Such engines are the 2-stroke ICEs, the hydraulic and air motors, wherein the force onto the piston is due to the pressure of the working fluid. Pumps/compressors constitute a similar case, wherein the force onto the piston at the phase of suction is exerted exclusively by the pulling spring 21; as regards remaining elements, the same apply as set out in the case of motors.

A feature/advantage of such an engine is its simplicity, the particularly small size/weight, the high power concentration and the compactness of construction compared to other conventional cases.

The advantages of the mechanisms of the present invention, in comparison to the disadvantages of the already existing ones, as well as the advantages of their implementation in piston engines (motors or pumps/compressors) and in automations are the following:

1. The exceptionally simple construction and the very small number of components required for their implementation.
2. The minimal number of moving components: only axle 11 or axis 6, rotor 3 and piston 4.
3. The possibility of implementing the valve arrangement with simple apertures without additional components and/or mechanisms.
4. The possibility of combining with conventional valves 18 and cams (ICE) in a disk-shaped cam 13 onto axis 6 or axle 11. The cams may be shaped in suitable configurations, so that they may open and close the valves more effectively in the predetermined times.
5. The possibility of achieving an absolutely harmonic reciprocation without higher order harmonics.
6. The reciprocating motion of piston 4 may be realized in various ways and described by simple mathematical equations. Typical cases of equations are the sinusoidal and the polyonymic.
7. The possibility of delaying the piston motion inversion in TDC and BDC for better combustion and improved efficiency.
8. The possibility of neutralizing completely the inertial forces of the reciprocating motion without balancing, only with the proper cylinder arrangement.
9. The substantial absence of friction and wear between piston 4 and liner 5 due to the entire lack of transverse forces between them.
10. The sub-multiple force (half being the maximum, for n=2), exerted at the points of contact of the undulated sliding surfaces A, B and $\Gamma_\alpha/\Gamma_\beta$ of stators 1, 2 and rotor 3, in relation to the force exerted at the point of contact of the gudgeon pin-piston rod of a conventional engine.
11. The minimization of friction and wear of the sliding undulated surfaces A, B and $\Gamma_\alpha/\Gamma_\beta$ of stators 1, 2 and rotor 3 respectively, because of the dynamic lubrication developed due to the favourable geometry.
12. The manufacturing capability of antipollution technology 2-stroke ICEs of a size/weight/cost roughly 50% that of the conventional 2-stroke ICEs or 25% that of the conventional 4-stroke ICEs.
13. The compact construction of multi-cylinder engines: it is possible to arrange the cylinders in line with one (FIG. 15.$f$) or two opposing axles (FIG. 15.$e$), or crosswise and crossways with a central axle (FIGS. 15.$g$ and $h$, respectively).
14. The roughly 50% size and/or volume reduction for the same power output and, consequently, the doubling of the power concentration. Reverse applies as well.
15. The roughly 50% reduction of the cost, due to the corresponding reduction of the size and/or volume for the same power output.

FIGURE INDICES

1. First annular component, stator.
2. Third annular component, stator.
3. Second annular component, rotor.
4. Piston or secondary clutch axis.
5. Liner,
6. Axle with sliding spline.
7. Body.
8. Cylinder cover.
9. Piston rings.
10. Valve spring (aperture).
11. Axle (common).
12. Axle gearwheel.
13. Cam disk.
14. Sliding element (wedge).
15. Axis gearwheel.
16. Body cover.
17. Valve rod.
18. Conventional/classic valve.
19. Coupling pin.
20. Coupler.
21. Pulling spring.

The invention claimed is:

1. A mechanism for transforming rotating to reciprocating motion, or vice versa,
    wherein the mechanism comprises a first annular component (1) and a second annular component (3) coaxially located, the first annular component beside the second annular component, along a longitudinal axis ($\Delta A$), wherein both of the first and the second annular components are able to rotate around the longitudinal axis and to reciprocate along the longitudinal axis, the first and the second annular components each have an undulated surface,
        a side (A) of the first annular component (1) adjacent to the second annular component (3) is in continuous contact, in at least one point, with a neighbouring side ($\Gamma_\alpha$) of the second annular component (3), such that the second annular component (3) is able to move coaxially in relation to the first annular component (1) in continuous contact in at least one point with the adjacent side (A) of the first annular component (1), the undulated surfaces of the contacting sides are smooth undulated surfaces (A, $\Gamma_\alpha$) formed as a geometric locus of the radii passing through smooth undulated curves ($\alpha$, $\gamma_\alpha$), respectively, of external cylindrical surfaces of the first and the second annular components (1, 3), starting from their external surface and characterized by n (natural number$\neq$0) repeated pairs of geometrically similar crests and valleys with a similarity ratio 1:3, the similarity ratio being defined as a ratio of coordinates of two similar geometric shapes as regards a common coordinate system wherein the coordinates of a first geometric shape result from multiplying corresponding coordinates of a second geometric shape by the similarity ratio, the crests/valleys are symmetric relative to the level defined by a highest/lowest point of the crest/valley (respectively) and the longitudinal axis,
        the crests of the undulated surface of the first annular component (1) may be in contact with the crests of the undulated surface of the second annular component (3) and, in this position, the points of contact are located on a plane perpendicular to the longitudinal axis, relative to which the undulated surfaces (A, $\Gamma_\alpha$) of the first annular component (1) and the second annular component (3) are symmetric,
        the crests of each of the undulated surfaces (A, $\Gamma_\alpha$) are smaller than the geometrically similar valleys with the similarity ratio of 1:3 such that, when they enter the valleys of the other, and crest edges come into contact with the lowest point of the opposite undulated surface, there is free space left between the undulated surfaces, resulting, when lubricated, in achieving friction and wear minimization due to dynamic lubrication,
        such that if the first annular component (1) and the second annular component (3) are forced into rotational movement relative to each other, remaining at the same time in continuous contact, then every point of the undulated surfaces (A, $\Gamma_\alpha$) will trace, in relation to the other, an undulated trajectory and at the same time will execute, in relation to the other, a reciprocating motion with a frequency n-times, wherein n is the number of crests/valleys, the corresponding rotational motion frequency, between a TDC (Top Dead Center) and a BDC (Bottom Dead Center), this relative motion being executed by each component connected firmly to one of the annular components (1, 3), while each component connected to one of the annular components (1, 3), such that this connected component is free not to follow the rotation of the component to which it is connected, executes reciprocating motion only, relative to the other annular component so that rotational motion is transformed to reciprocating motion of the component with or without coexisting rotation, whereas, conversely the forced relative reciprocating motion of one annular component (1, 3) relative to the other is transformed to rotational motion of the component with or without the coexistence of reciprocating motion,
        the edges of the crests and valleys in a planar spread of the undulated curves of the external surfaces of the first and the second annular components are points or straight sections vertical to the longitudinal axis, if the edges of the crests and valleys are points, in the case of relative rotational motion between the first and the second annular components (1, 3) at constant speed, a simple and/or harmonic reciprocation results, on the other hand, if the edges of the crests and valleys are straight sections, in case of relative rotational motion between the first and the second annular components (1, 3) with constant speed, a reciprocation results with a delay in the reversal of motion in the TDC and BDC, if the edges of the crests are straight sections of length c, and the edges of the valleys are straight sections of length 3c, respectively, the result is equal time intervals of delay in motion inversion in TDC and BDC.

2. The mechanism transforming rotating to reciprocating motion, or vice versa, according to claim 1, wherein the second annular component (3) is connected to a cylindrical component (4) either firmly, or in such a way that the second annular component (3) and the cylindrical component (4) have the freedom to at least one of remain stationary, reciprocate along the longitudinal axis, and rotate around the longitudinal axis, independently one from the other.

3. The mechanism transforming rotating to reciprocating motion, or vice versa, according to claim 2, further comprising a cylindrical liner (5), inside which moves—in circumferential contact—a cylindrical piston (4) covered by a cover (8), the cylindrical piston being the cylindrical component.

4. The mechanism transforming rotating to reciprocating motion, or vice versa, according to claim 3, wherein the cylindrical piston is a hollow piston (4) and is connected firmly to the second annular component (3) and on a surface of the piston (4) there is at least one aperture ($O_4$) which upon tracing a undulated trajectory (E) will meet at least one aperture ($O_5$) on the liner (5) located inside or cross trajectory (E), allowing for the periodic communication between the interior of the piston (4) and the exterior of liner (5), for as long as the apertures of the piston (4) and the liner (5) share common points, creating a very simple valve arrangement controlling the fluid flow between an internal space of a piston engine cylinder and an external environment, through the hollow piston (4) and the liner (5).

5. The mechanism transforming rotating to reciprocating motion, or vice versa, according to claim 1, wherein an additional mechanism forcing the second annular component (3) to be pushed onto the first annular component (1), in order for the undulated surface ($\Gamma_\alpha$) of the second annular component (3) to be in continuous contact with the undulated surface (A) of the first annular component (1).

6. The mechanism transforming rotating to reciprocating motion, or vice versa, according to claim 5, wherein the additional mechanism comprises a third annular component (2), coaxially mounted in relation to the first and the second annular components (1, 3) such that the second annular component (3) is located between the first and the third annular components (1, 2), the undulated surface ($\Gamma_\alpha$) of the second annular component (3) is a first undulated surface ($\Gamma_\alpha$) and the second annular component (3) further has a second undulated surface ($\Gamma_\beta$), an adjacent side of the third annular component (2), being the one towards the second annular component (3), is an undulated surface (B), wherein the undulated surface (B) of the third annular component (2) is characterized by the same undulated surface (A) of the first annular component (1), and by being in continuous contact in at least one point with a side of the second annular component (3) adjacent to it, which is also the second undulated surface ($\Gamma_\beta$) of the second annular component (3), wherein the second undulated surface ($\Gamma_\beta$) of the second annular component (3) is characterized by having the same undulated surface as the first undulated surface on the side ($\Gamma_\alpha$) of the second annular component (3) being adjacent to the first annular component (1), wherein the first and the second undulated surfaces ($\Gamma_\alpha$, $\Gamma_\beta$) of the second annular component (3) are arranged relative to each other such that either:
 crests of the second undulated surface ($\Gamma_\beta$) are axially aligned with valleys of the first undulated surface ($\Gamma_\alpha$), and the undulated surface (B) of the third annular component (2) is a mirror image of the undulated surface (A) of the first annular component (1), or
 valleys of the second undulated surface ($\Gamma_\beta$) are axially aligned with the valleys of the first undulated surface ($\Gamma_\alpha$), such that the first and the second undulated surfaces ($\Gamma_\alpha$, $\Gamma_\beta$) of the second annular component (3) are in mirror symmetry with each other, and valleys of the undulated surface (B) of the third annular component (2) are axially aligned with crests of the undulated surface (A) of the first annular component (1),
 the second annular component (3) may move relative to the first and the third annular components (1, 2), and in continuous contact in at least one point with the side of the first annular component (1), and with the side of the third annular component (2),
 the crests of the undulated surface (A) of the first annular component (1) may be in contact with the crests of the undulated surface ($\Gamma_\alpha$) of the second annular component (3) and that, in this location, the undulated surface (A) of the first annular component (1) and the first undulated surface ($\Gamma_\alpha$) of the second annular component (3) are both in symmetry to a plane connecting together their points of contact, whereas in this location the crests of the undulated surface (B) of the third annular component (2) are in contact with the valleys of the second undulated surface ($\Gamma_\beta$) of the second annular component (3) and the crests of the second undulated surface ($\Gamma_\beta$) of the second annular component (3) are in contact with the valleys of the undulated surface (B) of the third annular component (2), as a result of the geometrically similar crests and valleys with the similarity ratio 1:3.

7. The application of the mechanism according to claim 6, to a piston engine cylinder, wherein the first and the third annular components (1, 2) operate as stators and are firmly mounted onto a body (7), while the second annular component (3) functions as a rotor, either connected firmly to a piston (4) rotating and reciprocating axially, or connected with the possibility of rotating with the piston (4) reciprocating only axially, moving by a spline from an axis (6) coinciding with an axis of the piston engine cylinder or moving from the axis (6) through an axle (11) mounted outside the cylinder, parallel to its axis, and motion is transmitted to the axis (6) from the axle (11) by gear wheels (12, 15) or moving by the axle (11) through the gear wheels (12) and rack on the external surface of rotor (3), and valves with apertures are provided, or conventional/classic valves (18) and, in case of conventional/classic valves (18) in combination with a disk-shaped cam (13) and rods (17).

8. The application of the mechanism according to claim 7, to a piston engine cylinder, wherein the engine operates as a 2-stroke petrol engine with clean fuel without addition of lubricant, fuel injection is required, input of air with forced induction, equal time intervals of delay in motion inversion in TDC and BDC and the valves with apertures, or controlled by the disk-shaped cam (13) and rods (17), the valves operate in the following order:
 as soon as the expansion phase is completed and just before the piston reaches BDC,
 an output valve opens and most of the exhaust gases escape,
 then an input valve opens and the incoming air under pressure forces out the remainder of the exhaust gases (sweeping/flushing),
 the outlet valve then closes followed by the inlet valve once the cylinder is filled with air, and motion inversion starts towards TDC,
 followed by a compression phase, fuel ignition and combustion, and finally expansion,
 whereupon the same cycle starts all over again.

9. The application of the mechanism according to claim 6 in a clutch arrangement, wherein an axis (6) is connected through a sliding spline, to the second annular component (3) functioning as rotor, the third annular component (2) is connected firmly to a further component (4), and wherein a mechanism may exert an axial force (F) onto the first annular component (1), forcing the first and the third annular components (1, 2) to approach sufficiently one another, in this situation the second annular component (3) is immobilized between the first and third annular component (1, 2), whereupon the rotation of the axis (6) is transferred in its full effect to the further component (4), and wherein on the other hand, if the axial force (F) on the first annular component (1) is lifted by the mechanism, it will recede to an initial position, whereupon the second annular component (3) will be released and begin again moving sliding between the first and the third annular component (1, 2) and thus the transfer of rotation from the axis (6) to the further component (4) will be interrupted, and wherein the first and the third annular components are optionally connected to an external liner (7), and the first annular component with axially sliding wedges (14) and the third annular component with the possibility of slight rotation.

10. The application of the mechanism according to claim 6 in a differential arrangement comprising two mirror-image symmetric sections, each one consisting of a second annular component (3), functioning as a rotor, connected to an axis (6) by a sliding spline, a first annular component (1), a third annular component (2), a mechanism exerting the required force (F) on the first annular component (1) in order to approach sufficiently the third annular component (2), entrapping and immobilizing the second annular component (3) between the first and the third annular components (1, 2) such that the third annular component (3) is engaged and moving simultaneously to the axis (6), each one of the two third annular components (2) is connected firmly to a gearwheel (15), moved by another axis (11) through a cooperating gearwheel (12) such that, for as long as a resistance of two axes (6) to the motion is the same, the second annular components (3) remain in engagement with the third annular components (2) and the rotation of the gearwheel (15) is transferred to its full effect to axes (6), on the other hand if the resistance grows on one of the axes (6), the corresponding first annular component (1) will recede slightly, the corresponding second annular component (3) will be released and it will begin to move sliding between the first and the third annular component (1, 2), whereupon the number of rotations of the corresponding axis (6) will be reduced until the balance of the axes (6) resistances is restored and their number of rotations equalizes, each first annular component (1) is optionally connected to a body (7) using axial sliding (14), and each of the third annular components (2) is connected to body (7) is capable of slight circumferential sliding.

11. The application of the mechanism according to claim 6 to a device increasing/reducing the number of rotations wherein a mechanism for the transformation of rotational to reciprocal motion, or vice versa, with $n=n_1$ number of crests/valleys, in which a first and a third annular components (1, 2) function as stators and are mounted firmly on a body (7), while the second annular component (3) functions as a rotor firmly connected to a piston (4), rotating and reciprocating axially and moving by an axis (6) with a sliding spline, is connected coaxially to another similar mechanism, with the same reciprocation path (L) and a number of crests and valleys $n=n_2 \neq n_1$, via the pistons (4) and coupling pin (19) in a way allowing rotation relative to each other, however not the axial displacement, if the axis (6) of the first mechanism is rotating with $N_1$ rotations, then the axis (6) of the second mechanism will rotate with $N_2=N_1 \times (n_1/n_2)$ rotations (i.e., the pair of mechanisms functions as a rotation speed increasing-reducing device).

12. The application of the mechanism according to claim 6 to a device increasing/reducing the number of reciprocations, wherein a mechanism for the transformation of rotational to reciprocal motion, or vice versa, with $n=n_1$ number of crests/valleys, in which a first and a third annular component (1, 2) function as stators and are mounted firmly on a body (7), while the second annular component (3) functions as a rotor firmly connected to a piston (4), rotating and reciprocating axially and moving by an axis (6) with a sliding spline, is connected coaxially via the axes (6) and a coupler (20) with wedges (14) firmly to another similar mechanism, with a different number of crests/valleys $n=n_2 \neq n_1$, whereupon the pair of mechanisms functions as a device increasing/reducing reciprocating speed and/or the reciprocation path lengths, in case the reciprocation path $(L_1)$ of one mechanism differs from the reciprocation path $(L_2)$ of the other.

13. The application of mechanism according to claim 6 in the coupling of an electrical engine (E) with two similar engines (M) with cylinders which coincide with the axes of their cylinders, wherein bodies of the two similar engines (M) are mounted coaxially on a body (stator) of the electrical engine (E): one on the right and the other on the left, the rotor axis of the electrical engine (E) is abolished and substituted by axes (6) of the two engines (M), and in doing so they get synchronized relative to each other, resulting in operating with pistons moving in opposing directions in order to balance out the inertial forces of reciprocation.

14. The application of mechanism according to claim 1 in a two cylinder engine, wherein each of the cylinders operates with a pair of the annular components with undulated surfaces transforming motion on their adjacent sides, the cylinders are coaxial, mounted in a mirror-image arrangement, with the annular components moving in opposing directions functioning as pistons (4) for balancing the inertial forces of reciprocation, each of the cylinders comprises the first annular component (1) functioning as stator and the second annular component (3) functioning as rotor, connected firmly to a piston (4), the stators (1) are connected firmly relative to each other and with a common body (7), each of the rotors (3) bears external rack (indentation) cooperating with one gearwheel (12) of a pair of gearwheels mounted on a common axis (11) parallel to the longitudinal axis of the cylinders, the pair of gearwheels (12) synchronizes the rotors (3) and transfers motion to the common axis (11), whereupon a force is exerted on the pistons (4) as they move between TDC and BDC, which is due to the pressure of the working fluid and/or the assistance of a pulling spring (21), thus keeping the first undulated surfaces of the rotors (3) in contact with the corresponding stators (1), the pulling spring (21) connects the pistons (4) to each other via apertures on the stators (1) and is responsible for their recovery, and keeping the rotors (3) in continuous contact with the corresponding stators (1), which is particularly important during the period of time the engine is not operating, thus assuring its synchronization, each cylinder comprises traditional valves or valves with apertures or stem valves (18) which are controlled with a disk-shaped cam (13) and rods (17).

15. The application of mechanism according to claim 6, in a two cylinder, double effect piston engine, wherein the cylinders are coaxial, mounted in a mirror-image arrangement, with components moving in opposing directions to balance the inertial forces of reciprocation, each of the two cylinders comprises the first and the third annular components (1, 2) functioning as stators and the second annular component (3) functioning as a rotor, moving by a spline from a common axis (6) coinciding with the cylinder axis of the piston engine, the stators (1,2) are connected firmly to a common cylindrical liner-body (5/7), and in addition the stators (2) are connected to each other, the rotor (3) plays the role of a piston and the working fluid flows between the stators (1, 2), the rotor (3) and the cylindrical liner-body (5/7), valves with apertures are provided on the rotor (3) and the cylindrical liner-body (5/7) or conventional/classic traditional stem valves (18) on the cylindrical liner-body (5/7) and, in the case of traditional stem valves (18), using a conventional camshaft or controlled by a disk-shaped cam (13) and rods (17), also, on the cylindrical liner-body (5/7).

16. The application of mechanism according to claim 6, in an piston engine cylinder, wherein the cylinder comprises the first and the third annular components (1,2) functioning as stators and the second annular component (3) functioning as a rotor, wherein the stators (1,2) are connected firmly to a common body, wherein the rotor (3) plays the role of the piston and the working fluid flows between the stators (1, 2), the rotor (3) and the common body, wherein using valves with apertures on the rotor (3) or conventional/classic traditional stem valves (18) on the common body and, in the case of the traditional stem valves (18), also using a disk-shaped cam (13) and rods (17), also, on the common body.

\* \* \* \* \*